United States Patent
Yang et al.

(10) Patent No.: US 8,487,069 B2
(45) Date of Patent: Jul. 16, 2013

(54) LIQUID CRYSTAL PHOTO-ALIGNMENT AGENT, LIQUID CRYSTAL PHOTO-ALIGNMENT LAYER MANUFACTURED USING THE SAME, AND LIQUID CRYSTAL DISPLAY DEVICE INCLUDING THE LIQUID CRYSTAL PHOTO-ALIGNMENT LAYER

(75) Inventors: Jae-Deuk Yang, Uiwang-si (KR); Hee-Young Oh, Uiwang-si (KR); Myoung-Youp Shin, Uiwang-si (KR); Mi-Ra Im, Uiwang-si (KR); Guk-Pyo Jo, Uiwang-si (KR); Eun-Ha Kim, Uiwang-si (KR)

(73) Assignee: Cheil Industries Inc., Gumi-si (KR)

(*) Notice: Subject to any disclaimer, the term of this patent is extended or adjusted under 35 U.S.C. 154(b) by 248 days.

(21) Appl. No.: 12/873,420

(22) Filed: Sep. 1, 2010

(65) Prior Publication Data

US 2011/0144299 A1    Jun. 16, 2011

(30) Foreign Application Priority Data

Dec. 16, 2009  (KR) .................... 10-2009-0125512
Dec. 16, 2009  (KR) .................... 10-2009-0125513
Dec. 16, 2009  (KR) .................... 10-2009-0125516
Dec. 22, 2009  (KR) .................... 10-2009-0129005

(51) Int. Cl.
*C08G 69/08* (2006.01)

(52) U.S. Cl.
USPC ........ 528/331; 252/299.4; 349/123; 349/127; 428/1.2; 428/1.25; 428/1.26

(58) Field of Classification Search
USPC ......... 528/331; 252/299.4; 349/123; 428/1.2, 428/1.25, 1.26
See application file for complete search history.

(56) References Cited

U.S. PATENT DOCUMENTS

| | | | |
|---|---|---|---|
| 3,574,160 A | 4/1971 | Hsu et al. | |
| 4,985,529 A | 1/1991 | Saito et al. | |
| 6,307,002 B1 | 10/2001 | Okada et al. | |
| 6,887,534 B2 | 5/2005 | Nakata et al. | |
| 7,901,745 B2 | 3/2011 | Oh et al. | |
| 8,057,700 B2 | 11/2011 | Oh et al. | |
| 8,173,749 B2 | 5/2012 | Bachels et al. | |
| 2004/0009310 A1 | 1/2004 | Nakata et al. | |
| 2007/0036915 A1 | 2/2007 | Kurosaki et al. | |
| 2007/0093640 A1 | 4/2007 | Kim et al. | |
| 2007/0128378 A1 | 6/2007 | Kim et al. | |
| 2008/0293888 A1* | 11/2008 | Bachels et al. ............ | 525/200 |
| 2009/0146105 A1 | 6/2009 | Oh et al. | |
| 2009/0299014 A1* | 12/2009 | Oh et al. .................. | 525/412 |
| 2010/0047482 A1 | 2/2010 | Kim et al. | |
| 2010/0048849 A1 | 2/2010 | Eckert et al. | |
| 2011/0065859 A1 | 3/2011 | Bury et al. | |
| 2012/0172540 A1 | 7/2012 | Yang et al. | |

FOREIGN PATENT DOCUMENTS

| | | |
|---|---|---|
| CN | 101346342 A | 1/2009 |
| EP | 1801097 A1 | 6/2007 |
| JP | 59-145216 | 8/1984 |
| JP | 61-059334 | 3/1986 |
| JP | 2743460 A | 11/1990 |
| JP | 08-208983 | 8/1996 |
| JP | 09-080440 | 3/1997 |
| JP | 3322089 A | 3/1997 |
| JP | 09-272740 | 10/1997 |
| JP | 10183120 A | 7/1998 |
| JP | 2004-067589 | 3/2004 |
| JP | 2005-037920 | 2/2005 |
| JP | 2006-089492 | 4/2006 |
| JP | 2007-047762 A | 2/2007 |
| KR | 10-1998-0059346 | 10/1998 |
| KR | 100213178 B1 | 5/1999 |
| KR | 1020000035320 A | 6/2000 |
| KR | 1020020068695 A | 8/2002 |
| KR | 10-2003-0088503 A | 11/2003 |

(Continued)

OTHER PUBLICATIONS

USPTO structure search, Aug. 2012.*
Chinese Office Action in counterpart Chinese Application No. 201010251042.4 dated Nov. 5, 2012, pp. 1-7.
International Search Report in commonly owned International Application No. PCT/KR2007/006898, mailed Feb. 18, 2008.
Office Action in commonly owned U.S. Appl. No. 12/329,139 mailed Jan. 20, 2011, pp. 1-4.
Notice of Allowance in commonly owned U.S. Appl. No. 12/329,139 mailed Sep. 14, 2011, pp. 1-5.
Notice of Allowance in commonly owned U.S. Appl. No. 12/476,465 mailed Oct. 28, 2010, pp. 1-15.

*Primary Examiner* — Gregory Listvoyb
(74) *Attorney, Agent, or Firm* — Summa, Additon & Ashe, P.A.

(57) ABSTRACT

Disclosed is a liquid crystal photo-alignment agent including polyamic acid or a polyimide including a first structural unit derived from a photo-diamine represented by the following Chemical Formula 1, a second structural unit represented by the following Chemical Formula 2 or a polymer compound combination thereof, and a solvent.

[Chemical Formula 1]

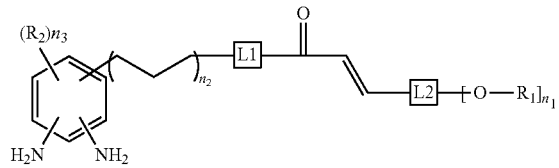

[Chemical Formula 2]

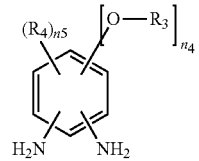

In Chemical Formulae 1 and 2, each substituent is the same as defined in the detailed description.

8 Claims, 1 Drawing Sheet

FOREIGN PATENT DOCUMENTS

| | | |
|---|---|---|
| KR | 10-2004-0050166 A | 6/2004 |
| KR | 1020040083610 A | 10/2004 |
| KR | 1020050065051 A | 6/2005 |
| KR | 10-2005-0106423 A | 11/2005 |
| KR | 2006-0115682 A | 11/2006 |
| KR | 10-2006-0123178 A | 12/2006 |
| KR | 1020070057658 A | 6/2007 |
| KR | 10-2008-0080663 A | 9/2008 |
| KR | 10-2008-0081846 A | 9/2008 |
| KR | 10-2009-0008730 A | 1/2009 |
| KR | 10-2009-0060000 A | 6/2009 |
| KR | 10-2009-0061567 A | 6/2009 |
| KR | 10-2009-0066077 A | 6/2009 |
| KR | 10-2009-0068077 A | 6/2009 |
| KR | 10-2009-0091664 A | 8/2009 |
| KR | 10-2009-0102698 A | 9/2009 |
| KR | 10-2009-0103871 A | 10/2009 |
| KR | 10-2010-0017575 A | 2/2010 |
| KR | 10-2010-0021491 A | 2/2010 |
| KR | 10-2010-0023122 A | 3/2010 |
| WO | 2007071091 A1 | 6/2007 |
| WO | 2008/126978 A1 | 10/2008 |
| WO | 2008/135131 A1 | 11/2008 |

\* cited by examiner

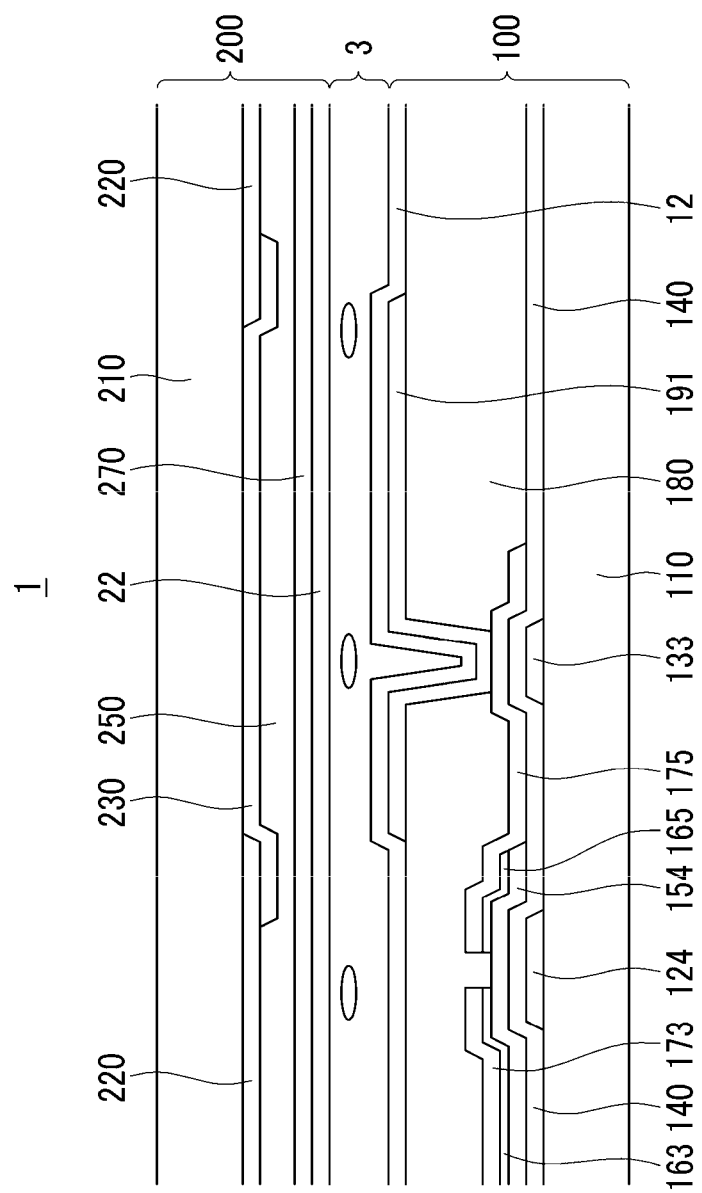

LIQUID CRYSTAL PHOTO-ALIGNMENT AGENT, LIQUID CRYSTAL PHOTO-ALIGNMENT LAYER MANUFACTURED USING THE SAME, AND LIQUID CRYSTAL DISPLAY DEVICE INCLUDING THE LIQUID CRYSTAL PHOTO-ALIGNMENT LAYER

CROSS-REFERENCE TO RELATED APPLICATIONS

This application claims priority to and the benefit of Korean Patent Application Nos. 10-2009-0125512, 10-2009-0125513, 10-2009-0125516, and 10-2009-0129005 filed in the Korean Intellectual Property Office on Dec. 16, 2009, Dec. 16, 2009, Dec. 16, 2009, and Dec. 22, 2009, respectively, the entire disclosure of each of which is incorporated herein by reference.

FIELD OF THE INVENTION

The present invention relates to a liquid crystal photo-alignment agent, a liquid crystal photo-alignment layer manufactured using the same, and a liquid crystal display including the liquid crystal photo-alignment layer.

BACKGROUND OF THE INVENTION

A liquid crystal display (LCD) includes a liquid crystal alignment layer. The liquid crystal alignment layer is mainly made of polymer materials. The liquid crystal photo-alignment layer plays a role of a director in aligning liquid crystal molecules. When the liquid crystal molecules are moved by the influence of an electric field to display an image, the liquid crystal photo-alignment layer allows them to be oriented in a predetermined direction. Generally, it is necessary to uniformly align the liquid crystal molecules in order to provide uniform brightness and a high contrast ratio to the liquid crystal device.

The conventional method of aligning the liquid crystal includes coating a polymer membrane such as a polyimide on a substrate made of a material such as glass, and rubbing the surface of the substrate with a fiber such as nylon or polyester in a certain direction. However, the rubbing method may cause serious problems while fabricating a liquid crystal panel due to fine dust or electrostatic discharge (ESD) that may be generated while rubbing the polymer membrane with the fiber.

In order to solve the problems of the rubbing method, there has been recent research on a photo-radiation method of inducing anisotropy to a polymer membrane by irradiating light on the membrane and thereby aligning liquid crystal molecules thereon. The photo-alignment method uses a polymer membrane material such as polyamic acid, a polyimide, or a polymer thereof, which is derived from diamines having a photo-functional group such as azobenzene, cumarine, chalcone, and cinnamate. The polymer material is dissolved in an organic solvent to prepare a liquid crystal photo-alignment agent. When the liquid crystal photo-alignment agent has poor printing properties, it may deteriorate photo-alignment properties, for example the vertical alignment property, during the operation of a liquid crystal display. Accordingly, there is active research on a liquid crystal photo-alignment agent having excellent printing properties, vertical photo-alignment properties, and the like.

SUMMARY OF THE INVENTION

An exemplary embodiment of the present invention provides a liquid crystal photo-alignment agent that may be photo-aligned even with low energy, and can have excellent texture, vertical alignment, and chemical resistance, stable liquid crystal alignment, easily coating properties, substrate adherence, electric optical characteristic, reliability in terms of an after-image, and processability, as well as easy liquid crystal application.

Another embodiment of the present invention provides a liquid crystal photo-alignment layer disposed using a liquid crystal photo-alignment agent according to the embodiment of the present invention.

Yet another embodiment of the present invention provides a liquid crystal display (LCD) including the liquid crystal photo-alignment layer.

According to an embodiment of the present invention, provided is a liquid crystal photo-alignment agent including a polymer compound comprising polyamic acid including a first structural unit derived from a photo-diamine represented by the following Chemical Formula 1 and a second structural unit derived from a functional diamine represented by the following Chemical Formula 2, a polyimide, or a combination thereof.

[Chemical Formula 1]

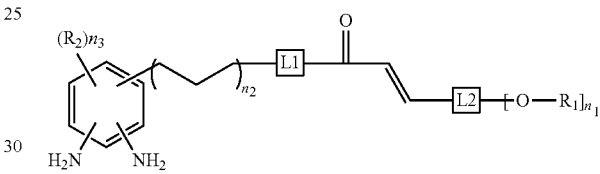

In Chemical Formula 1, each $R_1$ independently comprises a substituted or unsubstituted aliphatic organic group, a substituted or unsubstituted alicyclic organic group, or a substituted or unsubstituted aromatic organic group, each $R_2$ independently comprises a substituted or unsubstituted aliphatic organic group, a substituted or unsubstituted alicyclic organic group, or a substituted or unsubstituted aromatic organic group, L1 comprises —O— or —NH—, L2 comprises a functional group comprising unsubstituted alkylene, alkylene in which at least one hydrogen is substituted with a substituent comprising halogen or cyano, alkylene having at least one substituent comprising —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —NR'—, —CO—NR'—, —CH=CH—, —C≡C—, —O—CO—O—, —O—R"—, —CO—R"—, —CO—O—R"—, —O—CO—R"—, —Si(CH$_3$)$_2$—O—Si(CH$_3$)$_2$—, —NR'—R"—, —NR'—CO—R"—, —CO—NR'—R"—, —NR'—CO—O—R"—, —O—CO—NR'—R"—, —NR'—R"—, —CO—NR'—R"—, —CH=CH—R"—, —C≡C—R"—, or —O—CO—O—R"— (wherein R' is hydrogen or substituted or unsubstituted C1 to C6 alkyl and R" is arylene), —R"—O—CO—R"— (wherein R" is arylene), or a combination thereof, $n_1$ is an integer ranging from 1 to 5,
$n_2$ is an integer ranging from 0 to 3, and
$n_3$ is an integer ranging from 0 to 3.

[Chemical Formula 2]

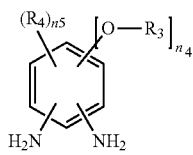

In Chemical Formula 2,
$n_4$ is an integer ranging from 1 to 4,
$n_5$ is an integer ranging from 0 to 3,
$n_4+n_5$ is an integer ranging from 1 to 4,
each $R_3$ independently comprises a substituted or unsubstituted aliphatic organic group, a substituted or unsubstituted alicyclic organic group, or a substituted or unsubstituted aromatic organic group, and
each $R_4$ independently comprises a substituted or unsubstituted aliphatic organic group, a substituted or unsubstituted alicyclic organic group, or a substituted or unsubstituted aromatic organic group.

The polyimide may be prepared by imidizing polyamic acid including a first structural unit derived from a photo-diamine represented by the Chemical Formula 1 and a second structural unit derived from a functional diamine represented by the Chemical Formula 2.

According to one embodiment of the present invention, the polymer compound may include the first and second structural units in a mole ratio ranging from 95 to 5 mol %:5 to 95 mol %.

The first structural unit may be derived from a photo-diamine represented by the following Chemical Formula 1-1.

each $R_2$ independently comprises a substituted or unsubstituted aliphatic organic group, a substituted or unsubstituted alicyclic organic group, or a substituted or unsubstituted aromatic organic group,
$n_1$ is an integer ranging from 1 to 5,
$n_2$ is an integer ranging from 0 to 3, and
$n_3$ is an integer ranging from 0 to 3.

According to another embodiment of the present invention, the polymer compound may further include a third structural unit derived from a diamine represented by the following Chemical Formula 2-1 as well as the first and second structural units. In this embodiment of the invention, the polymer compound may include the first, second, and third structural units in a mole ratio ranging from 40 to 80 mol %:5 to 30 mol %:5 to 30 mol %.

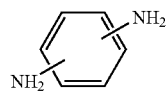

[Chemical Formula 2-1]

In addition, when the polymer compound further includes the third structural unit derived from a diamine represented by the above Chemical Formula 2-1, the first structural unit may be derived from a photo-diamine represented by the following Chemical Formula 1-2.

[Chemical Formula 1-1]

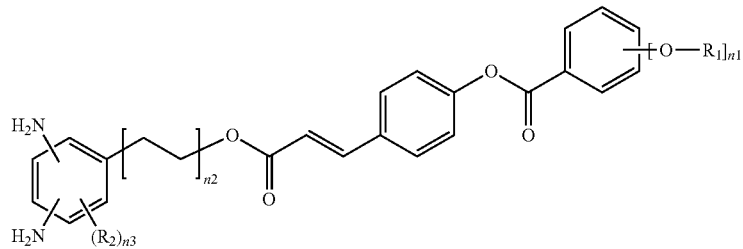

In Chemical Formula 1-1,
each $R_1$ independently comprises a substituted or unsubstituted aliphatic organic group, a substituted or unsubstituted alicyclic organic group, or a substituted or unsubstituted aromatic organic group,

[Chemical Formula 1-2]

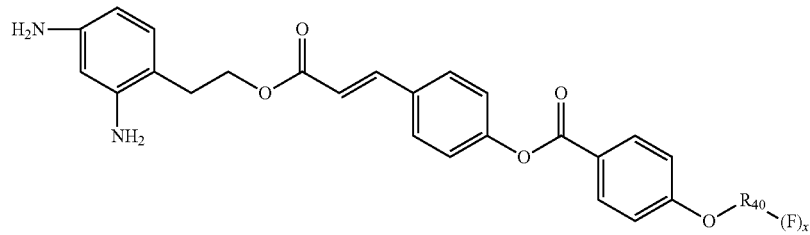

In Chemical Formula 1-2, $R_{40}$ comprises linear or branched substituted or substituted alkylene, wherein at least one of the —$CH_2$— groups of the alkylene is independently substituted with —CO—, —CO—O—, —$NR_{41}$—, —$NR_{41}CO$—, —CO—$NR_{41}$—, or —CH=CH—, wherein $R_{41}$ is hydrogen or alkyl, provided that oxygen atoms are not directly linked to each other, and x is 0 to 9, with the proviso that when x is 0, $R_{40}$ comprises linear or branched substituted or unsubstituted alkyl, wherein at least one of the —$CH_2$— groups of the alkyl is independently substituted with —CO—, —CO—O—, —$NR_{41}$—, —$NR_{41}CO$—, —CO—$NR_{41}$—, or —CH=CH—, wherein $R_{41}$ is hydrogen or alkyl, provided that oxygen atoms are not directly linked to each other.

According to still another embodiment of the present invention, the polymer compound may further include a third structural unit derived from the second photo-diamine represented by the following Chemical Formula 2-2 as well as the first and second structural units. In this embodiment of the invention, the polymer compound may include the first, second, and third structural units in a mole ratio ranging from 40 to 90 mol %:5 to 45 mol %:5 to 15 mol %.

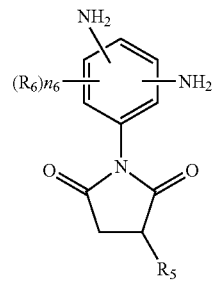

[Chemical Formula 3]

In Chemical Formula 3, $R_5$ comprises hydrogen, substituted or unsubstituted alkyl, substituted or unsubstituted aryl, or substituted or unsubstituted heteroaryl, each $R_6$ independently comprises hydrogen, substituted or unsubstituted alkyl, substituted or unsubstituted aryl, or substituted or unsubstituted heteroaryl, and

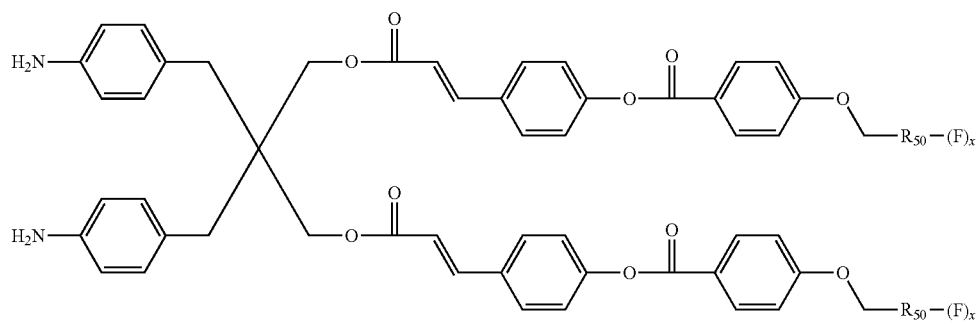

[Chemical Formula 2-2]

In Chemical Formula 2-2, x is an integer ranging from 0 to 9, and each $R_{50}$ independently comprises substituted or unsubstituted alkylene, wherein at least one of the —$CH_2$— groups of the alkylene is independently substituted with —CO—, —CO—O—, —$NR_{51}$—, —$NR_{51}CO$—, —CO—$NR_{51}$—, or —CH=CH—, wherein $R_{51}$ is hydrogen or alkyl, provided that oxygen atoms are not directly linked to each other, with the proviso that when x is 0, each $R_{50}$ independently comprises substituted or unsubstituted alkyl, wherein at least one of the —$CH_2$— groups of the alkyl is independently substituted with —CO—, —CO—O—, —$NR_{51}$—, —$NR_{51}CO$—, —CO—$NR_{51}$—, or —CH=CH—, wherein $R_{51}$ is hydrogen or alkyl, provided that oxygen atoms are not directly linked to each other.

In yet another embodiment of the present invention, the polymer compound may further include a third structural unit derived from more than one functional diamine selected from the following Chemical Formulas 3 to 6. In this embodiment of the invention, the polymer compound may include the first, second, and third structural units in a mole ratio ranging from 40 to 80 mol %:15 to 55 mol %:5 to 20 mol %.

$n_6$ is an integer ranging from 0 to 3.

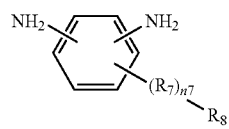

[Chemical Formula 4]

In Chemical Formula 4, each $R_7$ independently comprises a single bond, O, COO, NHCO, or CONH, $n_7$ is an integer ranging from 0 to 2, and each $R_8$ independently comprises substituted or unsubstituted alkyl, substituted or unsubstituted aryl, substituted or unsubstituted heteroaryl, alkyl including —O—, —COO—, —CONH—, —OCO—, or a combination thereof, or het eroaryl including —O—, —COO—, —CONH—, —OCO—, or a combination thereof.

[Chemical Formula 5]

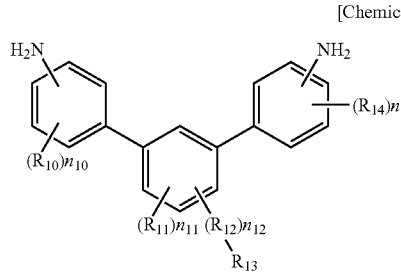

In Chemical Formula 5, each $R_{10}$, $R_{11}$, and $R_{14}$ is the same or different, and independently comprises substituted or unsubstituted alkyl, substituted or unsubstituted aryl, or substituted or unsubstituted heteroaryl, $R_{12}$ comprises O, COO, CONH, OCO, or substituted or unsubstituted alkylene, $R_{13}$ comprises hydrogen, substituted or unsubstituted alkyl, substituted or unsubstituted aryl, heteroaryl, substituted or unsubstituted cycloalkyl, substituted or unsubstituted cycloalkenyl, a fused ring of two or more of the foregoing groups, or alkyl, aryl, heteroaryl, cycloalkyl, or cycloalkenyl that further includes —O—, —COO—, —CONH—, —OCO—, or a combination thereof, respectively, $n_{11}$ is an integer ranging from 0 to 3, $n_{10}$ and $n_{14}$ are independently an integer ranging from 0 to 4, and $n_{12}$ is 0 or 1.

[Chemical Formula 6]

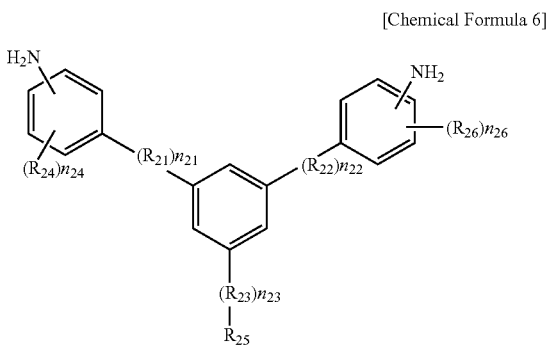

In Chemical Formula 6, each $R_{24}$ and $R_{26}$ is the same or different, and independently comprises substituted or unsubstituted C1 to C20 alkyl, substituted or unsubstituted aryl, substituted or unsubstituted heteroaryl, substituted or unsubstituted cycloalkyl, substituted or unsubstituted cycloalkenyl, or a fused ring of two or more of the foregoing groups, $R_{25}$ comprises hydrogen, substituted or unsubstituted alkyl, substituted or unsubstituted aryl, heteroaryl, substituted or unsubstituted cycloalkyl, substituted or unsubstituted cycloalkenyl, or a fused ring of two or more of the foregoing groups, $R_{21}$ and $R_{22}$ is the same or different, and independently comprise 0 or COO, $R_{23}$ is O, COO, CONH or OCO, $n_{24}$ and $n_{26}$ are the same or different, and independently are an integer ranging from 0 to 4, and $n_{21}$ to $n_{23}$ are the same or different, and independently are an integer of 0 or 1.

The polymer compound may have a weight average molecular weight ranging from 50,000 to 500,000.

The liquid crystal photo-alignment agent may further include a solvent and may have a solid content ranging from 1 to 30 wt % and a viscosity ranging from 3 to 35 cps.

Another embodiment of the present invention provides a liquid crystal photo-alignment layer prepared by coating the liquid crystal photo-alignment agent on a substrate.

Still another embodiment of the present invention provides a liquid crystal display (LCD) including the liquid crystal photo-alignment layer.

Hereinafter, further embodiments of the present invention will be described in detail.

The liquid crystal photo-alignment agent of the present invention may be photo-aligned even with low energy and can have excellent texture.

BRIEF DESCRIPTION OF THE DRAWING

FIG. 1 is a cross-sectional view of a liquid crystal display (LCD) according to one embodiment of the present invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "alkyl" refers to C1-C30 alkyl, for example, C1-C20 alkyl, the term "alkylene" refers to C1-C30 alkylene, for example, C1-C20 alkylene, and as another example C1-C6 alkylene, the term "alkenyl" refers to C2 to C20 alkenyl, the term "alkynyl" refers to C2 to C20 alkynyl, the term "cycloalkylene" refers to C3-C30 cycloalkylene, for example C3-C20 cycloalkylene, the term "cycloalkyl" refers to C3 to C50 cycloalkyl, for example C3-C30 cycloalkyl, and as another example C3-C20 cycloalkyl, the term "cycloalkenyl" refers to C3 to C50 cycloalkenyl, the term "heterocycloalkylene" refers to C2-C30 heterocycloalkylene, for example, C2-C20 heterocycloalkylene, the term "aryl" refers to C6-C30 aryl, for example, C6-C20 aryl, the term "heteroaryl" refers to C2-C30 heteroaryl, for example, C2-C20 heteroaryl, the term "arylene" refers to C6-C30 arylene, for example, C6-C20 arylene, the term "heteroarylene" refers to C2-C30 heteroarylene, the term "alkylaryl group" refers to C7-C30 alkylaryl, for example, C7-C20 alkylaryl, the term "heterocycloalkyl" refers to C2-C30 heterocycloalkyl, for example, C2-C20 heterocycloalkyl, and the term "halogen" refers to F, Cl, Br, or I.

As used herein, when a specific definition is not otherwise provided, the term "alicyclic cyclic group" refers to a C3 to C50 cycloalkyl group or a C3 to C50 cycloalkenyl group.

As used herein, when a specific definition is not otherwise provided, the term "substituted" refers to a functional group where at least one hydrogen is substituted with at least one substituent comprising halogen, substituted or unsubstituted C1 to C30 alkyl, substituted or unsubstituted C1 to C30 haloalkyl, substituted or unsubstituted C6 to C30 aryl, substituted or unsubstituted C2 to C30 heteroaryl, substituted or unsubstituted C1 to C20 alkoxy, hydroxy, nitro, cyano, amino ($NH_2$, $NH(R_{100})$, or $N(R_{101})(R_{102})$, wherein $R_{100}$, $R_{101}$, and $R_{102}$ are the same or different, and are independently C1 to C10 alkyl), amidino, hydrazine, hydrazone, carboxyl, substituted or unsubstituted alicyclic organic group, substituted or unsubstituted alkenyl, substituted or unsubstituted alkynyl, substituted or unsubstituted heterocycloalkyl, or a combination thereof.

As used herein, when a specific definition is not otherwise provided, the term "hetero" refers to one including 1 to 3 heteroatoms comprising N, O, S, P, or a combination thereof.

As used herein, when a specific definition is not otherwise provided, the term "aliphatic" refers to C1 to C30 alkyl, C2 to C30 alkenyl, C2 to C30 alkynyl, C1 to C30 alkylene, C2 to C30 alkenylene, or C2 to C30 alkynylene, for example, C1 to C20 alkyl, C2 to C20 alkenyl, C2 to C20 alkynyl, C1 to C20 alkylene, C2 to C20 alkenylene, or C2 to C20 alkynylene, the term "alicyclic" refers to C3 to C30 cycloalkyl, C3 to C30 cycloalkenyl, C3 to C30 cycloalkynyl, C3 to C30 cycloalkylene, C3 to C30 cycloalkenylene, or C3 to C30 cycloalkynylene, for example, C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic" refers to C6 to C30 aryl, C2 to C30 heteroaryl, C6 to C30 arylene, or C2 to C30 heteroarylene, for example, C6 to C20 aryl, C2 to C20 heteroaryl, C6 to C20 arylene, or C2 to C20 heteroarylene.

As used herein, when a definition is not otherwise provided, the term "combination" refers to a mixture or copolymer, and can also refer to a fused ring of alicyclic and/or aromatic organic groups, or two or more ring structures of alicyclic and/or aromatic organic groups, which are connected by a single bond comprising a functional group such as O, S, C(=O), CH(OH), S(=O), S(=O)$_2$, Si(CH$_3$)$_2$, (CH$_2$)$_p$ (herein, 1≦p≦2), CF$_{2q}$ (herein, 1≦q≦2) C(CH$_3$)$_2$, C(CF$_3$)$_2$, C(CH$_3$)(CF$_3$), or C(=O)NH. Herein, the term "copolymerization" can include block copolymerization and/or random copolymerization, and the term "copolymer" can include a block copolymer and/or a random copolymer.

In addition, the mark "*" refers to a place connected with the same or different atoms or chemical formulas.

According to one embodiment of the present invention, a liquid crystal photo-alignment agent may include a polymer compound comprising polyamic acid including a first structural unit derived from a photo-diamine represented by the following Chemical Formula 1 and a second structural unit derived from a functional diamine represented by the following Chemical Formula 2, a polyimide prepared by imidizing polyamic acid including a first structural unit derived from a photo-diamine represented by the following Chemical Formula 1 and a second structural unit derived from a functional diamine represented by the following Chemical Formula 2, or a combination thereof.

[Chemical Formula 1]

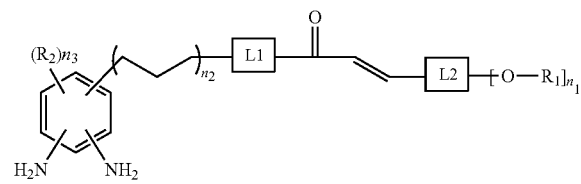

In Chemical Formula 1, each R$_1$ independently comprises a substituted or unsubstituted aliphatic organic group; a substituted or unsubstituted alicyclic organic group; or a substituted or unsubstituted aromatic organic group, each R$_2$ independently comprises a substituted or unsubstituted aliphatic organic group; a substituted or unsubstituted alicyclic organic group; or a substituted or unsubstituted aromatic organic group, L1 is —O— or —NH—, L2 comprises a functional group comprising unsubstituted alkylene; alkylene in which at least one hydrogen is substituted with halogen or cyano; alkylene including at least one substituent comprising —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —NR'—, —CO—NR'—, —CH=CH—, —C≡C—, —O—CO—O—, —O—R"—, —CO—R"—, —CO—O—R"—, —O—CO—R"—, —Si (CH$_3$)$_2$—O—Si(CH$_3$)$_2$—, —NR'—R"—, —NR'—CO—R"—, —CO—NR'—R"—, —NR'—CO—O—R"—, —O—CO—NR'—R"—, —NR'—R"—, —CO—NR'—R"—, —CH=CH—R"—, —C≡C—R"—, or —O—CO—O—R"— (wherein R' is hydrogen or substituted or unsubstituted C1 to C6 alkyl and R" is arylene); —R"—O—CO—R"— (wherein R" is arylene); or a combination thereof, n$_1$ is an integer ranging from 1 to 5, n$_2$ is an integer ranging from 0 to 3, and n$_3$ is an integer ranging from 0 to 3.

In addition, when n$_1$ is an integer of 2 or more, each R$_1$ may be the same or different. When n$_3$ is an integer of 2 or more, each R$_2$ may be the same or different.

[Chemical Formula 2]

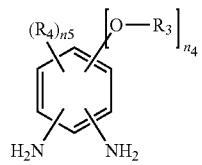

In Chemical Formula 2, each R$_3$ independently comprises a substituted or unsubstituted aliphatic organic group; a substituted or unsubstituted alicyclic organic group; or a substituted or unsubstituted aromatic organic group, each R$_4$ independently comprises a substituted or unsubstituted aliphatic organic group; a substituted or unsubstituted alicyclic organic group; or a substituted or unsubstituted aromatic organic group, n$_4$ is an integer ranging from 1 to 4, n$_5$ is an integer ranging from 0 to 3, and n$_4$+n$_5$ is an integer ranging from 1 to 4.

In addition, when n$_4$ is an integer of 2 or more, each R$_3$ may be the same or different. When n$_5$ is an integer of 2 or more, each R$_4$ may be the same or different.

Since the liquid crystal photo-alignment agent includes the first and second structural units, it may have excellent liquid crystal photo-alignment properties, electric-optical characteristics, and adhesion, and also excellent vertical alignment.

In addition, since the liquid crystal photo-alignment agent includes a functional diamine represented by the above Chemical Formula 2, it may have improved adhesion and may substantially maintain vertical alignment even after operating a liquid crystal display. Accordingly, the liquid crystal photo-alignment agent may be effectively used to prepare a vertical alignment mode (VA mode) liquid crystal alignment layer.

According to one embodiment of the present invention, the polymer compound may include the first and second structural units in a mole ratio ranging from 95 to 5 mol %:5 to 95 mol %, for example a mole ratio ranging from 95:5 mol % to 50:50 mol %. When the polymer compound includes the first and second structural units in a mole ratio within the above ranges, the polymer compound may effectively improve adhesion and significantly maintain vertical alignment, and can accordingly effectively improve liquid crystal photo-alignment properties and electric-optical characteristics.

In exemplary embodiments of the invention, the first structural unit may be derived from a photo-diamine represented by the following Chemical Formula 1-1.

[Chemical Formula 1-1]

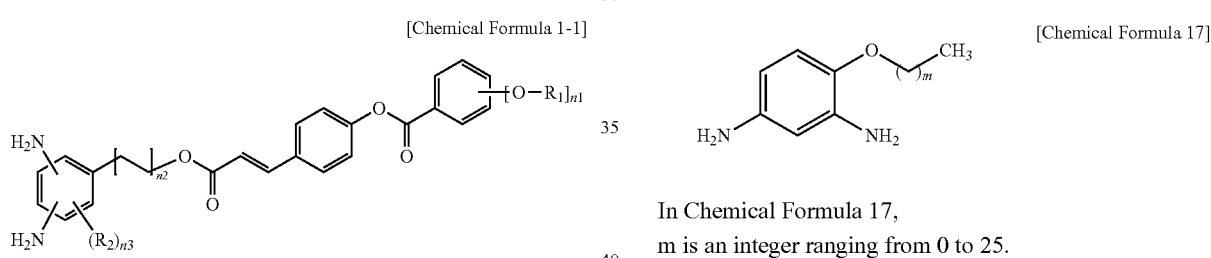

In addition, the first structural unit may be derived from a cinnamate-based photo-diamine. Examples of the cinnamate-based photo-diamine may include a compound represented by the following Chemical Formula 15, but are not limited thereto.

[Chemical Formula 15]

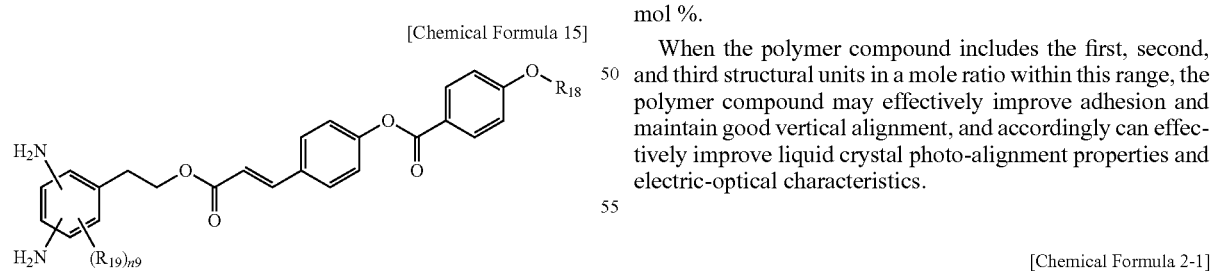

In Chemical Formula 15, $R_{18}$ and $R_{19}$ are the same or different, and independently comprise a substituted or unsubstituted aliphatic organic group, a substituted or unsubstituted alicyclic organic group, or a substituted or unsubstituted aromatic organic group. In one embodiment, $R_{18}$ comprises a fluorine-substituted aliphatic organic group, a fluorine-substituted alicyclic organic group, or a fluorine-substituted aromatic organic group, and $n_9$ is an integer ranging from 0 to 3.

When $n_9$ is an integer of 2 or more, each $R_{19}$ may be the same or different.

In addition, examples of the photo-diamine represented by the above Chemical Formula 1 may include a compound represented by the following Chemical Formula 16, but are not limited thereto.

[Chemical Formula 16]

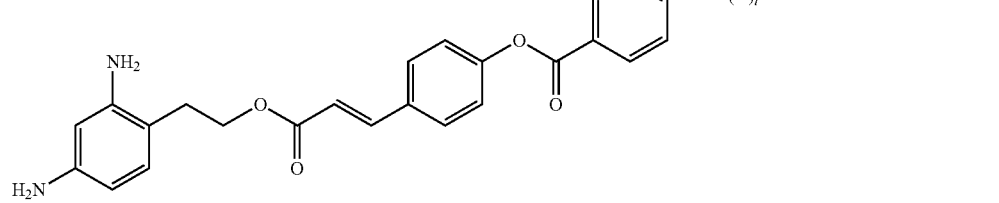

In Chemical Formula 16, l is an integer ranging from 0 to 10.

In addition, the second structural unit may be derived from a diamine represented by the following Chemical Formula 17, but is not limited thereto.

[Chemical Formula 17]

In Chemical Formula 17, m is an integer ranging from 0 to 25.

According to one embodiment of the present invention, the polymer compound may further include a third structural unit derived from a diamine represented by the following Chemical Formula 2-1 as well as the first and second structural units. In this embodiment of the invention, the polymer compound may include the first, second, and third structural units in a mole ratio ranging from 40 to 80 mol %:5 to 30 mol %:5 to 30 mol %.

When the polymer compound includes the first, second, and third structural units in a mole ratio within this range, the polymer compound may effectively improve adhesion and maintain good vertical alignment, and accordingly can effectively improve liquid crystal photo-alignment properties and electric-optical characteristics.

[Chemical Formula 2-1]

In addition, when the polymer compound includes a third structural unit derived from a diamine represented by the above Chemical Formula 2-1, a first structural unit may be derived from a photo-diamine represented by the following Chemical Formula 1-2.

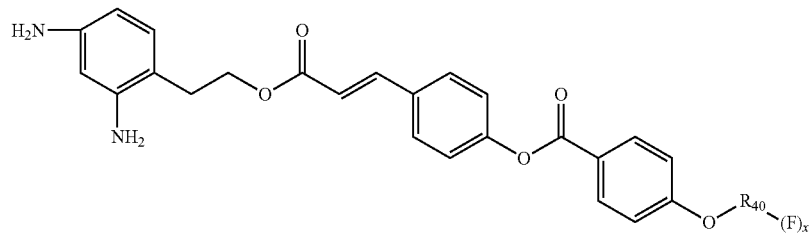

[Chemical Formula 1-2]

In Chemical Formula 1-2, $R_{40}$ comprises linear or branched substituted or substituted alkylene, wherein at least one of the —$CH_2$— groups of the alkylene is independently substituted with —CO—, —CO—O—, —$NR_{41}$—, —$NR_{41}CO$—, —CO—$NR_{41}$—, or —CH=CH—, wherein $R_{41}$ is hydrogen or alkyl, provided that oxygen atoms are not directly linked to each other, and x is 0 to 9, with the proviso that when x is 0, $R_{40}$ comprises linear or branched substituted or unsubstituted alkyl, wherein at least one of the —$CH_2$— groups of the alkyl is independently substituted with —CO—, —CO—O—, —$NR_{41}$—, —$NR_{41}CO$—, —CO—$NR_{41}$—, or —CH=CH—, wherein $R_{41}$ is hydrogen or alkyl, provided that oxygen atoms are not directly linked to each other.

According to one embodiment of the present invention, the polymer compound may further include a third structural unit derived from the photo-diamine represented by the following Chemical Formula 2-2 as well as the first and second structural units. In this embodiment of the invention, the polymer compound may include the first, second, and third structural units in a mole ratio ranging from 40 to 90 mol %:5 to 45 mol %:5 to 15 mol %. When the polymer compound includes the first, second, and third structural units in a mole ratio within this range, the polymer compound may maintain optimum liquid crystal alignment and promote imidization, and thus can have an advantageous influence on an additional after-image.

[Chemical Formula 2-2]

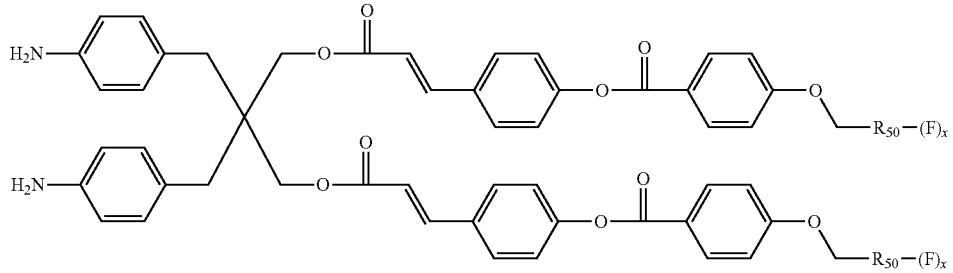

In Chemical Formula 2-2, x is an integer ranging from 0 to 9, and each $R_{50}$ independently comprises substituted or unsubstituted alkylene, wherein at least one of the —$CH_2$— groups of the alkylene is independently substituted with —CO—, —CO—O—, —$NR_{51}$—, —$NR_{51}$CO—, —CO—$NR_{51}$—, or —CH=CH—, wherein $R_{51}$ is hydrogen or alkyl, provided that oxygen atoms are not directly linked to each other, with the proviso that when x is 0, each $R_{50}$ independently comprises substituted or unsubstituted alkyl, wherein at least one of the —$CH_2$— groups of the alkyl is independently substituted with —CO—, —CO—O—, —$NR_{51}$—, —$NR_{51}$CO—, —CO—$NR_{51}$—, or —CH=CH—, wherein $R_{51}$ is hydrogen or alkyl, provided that oxygen atoms are not directly linked to each other.

According one embodiment of the present invention, the polymer compound may further include a third structural unit derived from at least one functional diamine selected from the following Chemical Formulas 3 to 6. In this embodiment of the invention, the polymer compound may include the first, second, and third structural units in a mole ratio ranging from 40 to 80 mol %:15 to 55 mol %:5 to 20 mol %. When the polymer compound includes the first, second, and third structural units in a mole ratio within this range, the polymer compound may maintain liquid crystal alignment and promote imidization, and thus may have a good influence on an after-image.

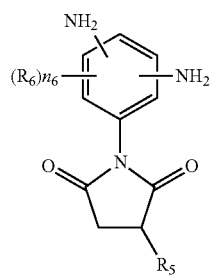

[Chemical Formula 3]

In Chemical Formula 3, $R_5$ comprises hydrogen, substituted or unsubstituted alkyl, substituted or unsubstituted aryl, or substituted or unsubstituted heteroaryl, each $R_6$ independently comprises hydrogen, substituted or unsubstituted alkyl, substituted or unsubstituted aryl, or substituted or unsubstituted heteroaryl, and $n_6$ is an integer ranging from 0 to 3.

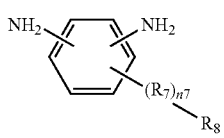

[Chemical Formula 4]

In Chemical Formula 4, each $R_7$ independently comprises a single bond, O, COO, NHCO, or CONH, $n_7$ is 0 to 2, each $R_8$ independently comprises substituted or unsubstituted alkyl; substituted or unsubstituted aryl; substituted or unsubstituted heteroaryl; alkyl including —O—, —COO—, —CONH—, —OCO—, or a combination thereof; or heteroaryl including —O—, —COO—, —CONH—, —OCO—, or a combination thereof.

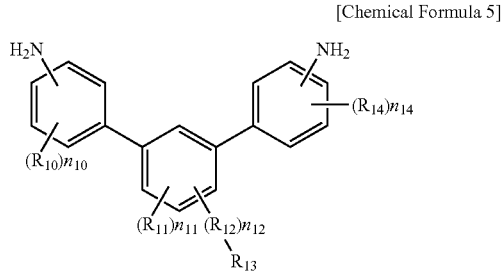

[Chemical Formula 5]

In Chemical Formula 5, each $R_{10}$, $R_{11}$, and $R_{14}$ is the same or different, and independently comprise substituted or unsubstituted alkyl, substituted or unsubstituted aryl, or substituted or unsubstituted heteroaryl, $R_{12}$ comprises O, COO, CONH, OCO, or substituted or unsubstituted alkylene, $R_{13}$ comprises selected from hydrogen, substituted or unsubstituted alkyl, substituted or unsubstituted aryl, heteroaryl, substituted or unsubstituted cycloalkyl, substituted or unsubstituted cycloalkenyl, a fused ring of two or more of the foregoing groups, or alkyl, aryl, heteroaryl, cycloalkyl, or cycloalkenyl that further include —O—, —COO—, —CONH—, —OCO—, or a combination thereof, respectively, $n_{11}$ is an integer ranging from 0 to 3, $n_{10}$ and $n_{14}$ are independently an integer ranging from 0 to 4, and $n_{12}$ is 0 or 1.

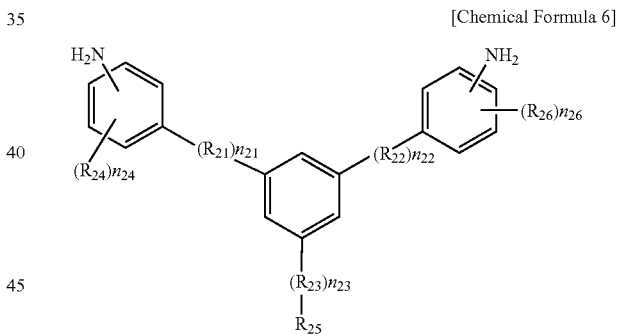

[Chemical Formula 6]

In Chemical Formula 16, each $R_{24}$ and $R_{26}$ is the same or different, and independently comprises substituted or unsubstituted C1 to C20 alkyl, substituted or unsubstituted aryl, substituted or unsubstituted heteroaryl, substituted or unsubstituted cycloalkyl, substituted or unsubstituted cycloalkenyl, or a fused ring of two or more of the foregoing groups, $R_{25}$ comprises hydrogen, substituted or unsubstituted alkyl, substituted or unsubstituted aryl, heteroaryl, substituted or unsubstituted cycloalkyl, substituted or unsubstituted cycloalkenyl, or a fused ring of two or more of the foregoing groups, each $R_{21}$ and $R_{22}$ is the same or different, and independently comprises O or COO, $R_{23}$ is O, COO, CONH, or OCO, $n_{24}$ and $n_{26}$ are the same or different, and independently are an integer ranging from 0 to 4, and $n_{21}$ to $n_{23}$ are the same or different, and independently are an integer of 0 or 1.

Examples of the diamine represented by the above Chemical Formula 4 include a compound represented by the following Chemical Formulae 8 to 10.

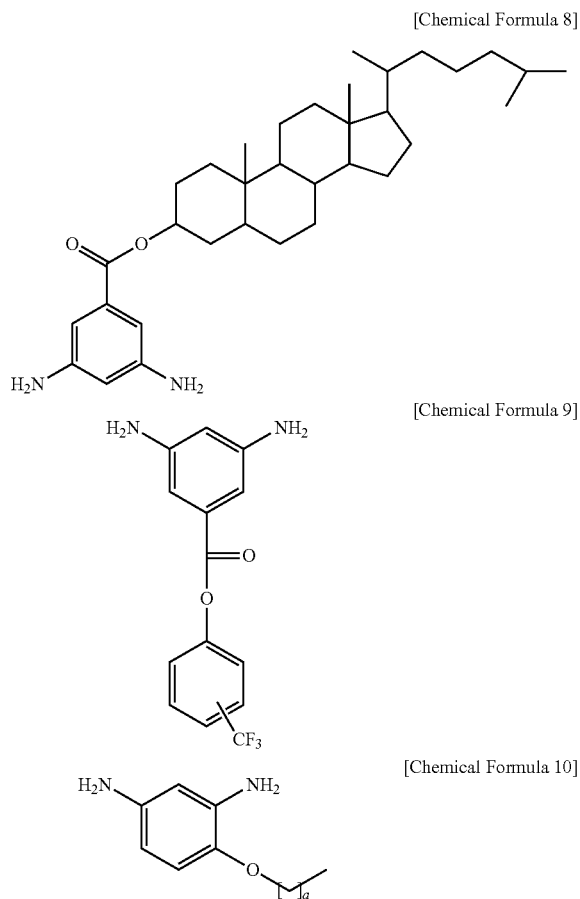

[Chemical Formula 8]

[Chemical Formula 9]

[Chemical Formula 10]

In Chemical Formula 10, a is an integer ranging from 10 to 30.

According to one embodiment of the present invention, the functional diamine may include a compound represented by the above Chemical Formulas 3, 4, or 8.

According to one embodiment of the present invention, polyamic acid including the first, second, and third structural units may be represented by the following Chemical Formula 11, and a polyimide may be represented by the following Chemical Formula 12.

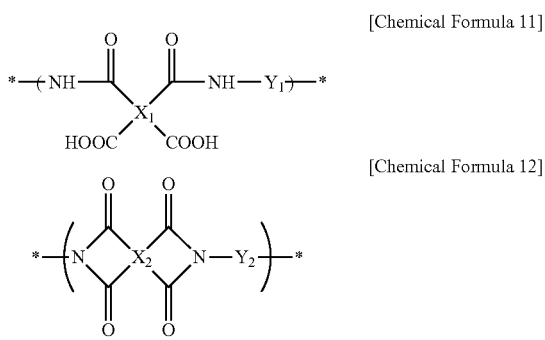

[Chemical Formula 11]

[Chemical Formula 12]

In the above Chemical Formulas 11 and 12, $Y_1$ and $Y_2$ are the same or different in each repeating unit. In addition, $Y_1$ and $Y_2$ may include the first structural unit derived from the photo-diamine represented by the above Chemical Formula 1, while the second structural unit may be derived from a diamine represented by the above Chemical Formula 2. Furthermore, they may further include a third structural unit selectively derived from at least one functional diamine represented by the above Chemical Formulas 3 to 6, a diamine represented by the above Chemical Formula 2-1, or a diamine represented by the above Chemical Formula 2-2. The first and second structural units, and selectively the third structural unit, may have the same mole ratio as aforementioned.

The $X_1$ and $X_2$ are the same or different in each repeating unit. In addition, $X_1$ and $X_2$ are independently a tetravalent organic group derived from alicyclic acid dianhydride or aromatic acid dianhydride.

Since a liquid crystal alignment agent according to one embodiment of the present invention includes a polymer compound including the first and second structural units derived from a photo-diamine represented by Chemical Formula 1 and a diamine represented by the above Chemical Formula 2, it may maintain vertical alignment and can have excellent brightness during the operation as compared with a liquid crystal photo-alignment agent including a polymer compound including a structural unit derived from a photo-diamine represented by Chemical Formula 1. In addition, it may be photo-aligned with low energy and may have excellent texture.

The functional diamine used in a liquid crystal photo-alignment agent according to one embodiment of the present invention is a vertical alignment mode diamine facilitating vertical alignment, and may induce liquid crystal alignment toward a side chain direction. Accordingly, it may have improved processibility and chemical resistance, and may secure stability in printing, rubbing, and cleaning processes. In addition, the liquid crystal alignment toward a side chain direction may facilitate adjustment of a pretilt angle due to an amount change of the functional diamine. These characteristics may be used for a vertical alignment (VA) mode in which liquid crystals are aligned in a vertical direction, and thus can bring about a good influence on stability of the vertical alignment.

According to one embodiment of the present invention, a polymer compound included in a liquid crystal photo-alignment agent may be prepared by polymerizing a photo-diamine represented by the above Chemical Formula 1, a diamine represented by the above Chemical Formula 2, and selectively at least one functional diamine represented by the above Chemical Formula 2-1, 2-2, or 3 to 6 with acid dianhydride. The polymer compound may be polyamic acid or a polyimide prepared by imidizing the polyamic acid. In addition, the polymer compound may include both of the polyamic acid and the polyimide. When the polyamic acid and the polyimide polymer are mixed together, they may have various mixing ratios with no particular limit.

A method of preparing polyamic acid by copolymerizing the acid dianhydride and diamine may include any common method known in the related field but is not limited to conventional copolymerization of polyamic acid. In addition, a method of imidizing the polyamic acid may include any method known in this related field with no particular limit.

According to one embodiment of the present invention, the functional diamine may include a compound represented by the above Chemical Formula 3 or 4, and in particular, a compound represented by the above Chemical Formula 3 or 8.

According to one embodiment of the present invention, the first, second, and third structural units may have various mole ratios depending on kinds of a compound.

In addition, the diamine and acid dianhydride may be mixed in various ratios with no particular limit.

According to one embodiment of the present invention, since a polymer compound includes a diamine represented by the above Chemical Formula 2 and optionally a functional diamine represented by the above Chemical Formula 2-1, 2-2, or 3 to 6 other than photo-diamine represented by Chemical Formula 1, a liquid crystal photo-alignment agent including the polymer compound may maintain vertical alignment but may have excellent luminance during the operation compared with the one including a polymer compound prepared using only a photo-diamine represented by Chemical Formula 1. In addition, the liquid crystal photo-alignment agent may be photo-aligned with low energy and may have excellent texture.

The method of preparing polyamic acid by copolymerizing the acid dianhydride and diamine may include any conventional method known for copolymerization of polyamic acid with no limit. In addition, the polyamic acid may be imidized in any method known in the related field.

The acid dianhydride may include aliphatic cyclic acid dianhydride, aromatic acid dianhydride, or a mixture thereof. When the acid dianhydride includes a mixture of aliphatic cyclic acid dianhydride and aromatic acid dianhydride, they may be included in an amount ranging from 5 to 90 mol % and from 10 to 95 mol %, respectively. For example, the aliphatic cyclic acid dianhydride and aromatic acid dianhydride may be mixed in a ratio ranging from 50 to 20 mol % and from 50 to 80 mol %. When the aromatic acid dianhydride is used in an amount within these ranges, it may improve mechanical and heat resistance characteristics of a liquid crystal alignment layer, and also electrical characteristics such as voltage holding ratio.

When the aliphatic cyclic acid dianhydride is used to prepare polyamic acid and/or a soluble polyimide polymer, it may compensate for problems such as insolvability in a common organic solvent, low transmission in a visible ray region due to a charge transfer complex, deterioration of electric-optical characteristics due to high polarity in terms of molecule structure, and the like.

Exemplary aliphatic cyclic acid dianhydrides include without limitation 1,2,3,4-cyclobutanetetracarboxylic acid dianhydride (CBDA), 5-(2,5-dioxotetrahydropuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentanedianhydride, 1,2,3,4-tetracarboxyl cyclopentanedianhydride, and mixtures thereof.

When a liquid crystal alignment agent including polyamic acid and/or a soluble polyimide polymer prepared by using an aromatic acid dianhydride is coated to be 800 to 1000 Å thick, the liquid crystal alignment layer may endure a rubbing process, have excellent chemical resistance, and maintain heat resistance at a high temperature of 200° C. or higher.

Exemplary aromatic acid dianhydrides include without limitation pyromellitic acid dianhydride (PMDA), biphthalic acid dianhydride (BPDA), oxydiphthalic acid dianhydride (ODPA), benzophenonetetracarboxylic acid dianhydride (BTDA), hexafluoroisopropylidenediphthalic acid dianhydride (6-FDA), 3,4-dicarboxyl-1,2,3,4-tetrahydro-1-naphthalenesuccinic acid dianhydride (TDA), and mixtures thereof.

According to one embodiment of the present invention, polyamic acid or a soluble polyimide included in a liquid crystal photo-alignment agent may respectively have a weight average molecular weight ranging from 50,000 to 500,000. In addition, when the polyamic acid is imidized, a soluble polyimide may have a glass transition temperature ranging from 200 to 350° C. When the polyamic acid or polyimide has a weight average molecular weight within this range, it may improve thermal stability and chemical resistance of an alignment layer. Thus, the alignment layer may maintain appropriate viscosity and have an excellent printing property and uniformity.

According to one embodiment of the present invention, the liquid crystal photo-alignment agent may further include a solvent. Any solvent that can dissolve polyamic acid and/or a polyimide may be used.

The solvent can include an aprotic solvent such as but not limited to N-methyl-2-pyrrolidone (NMP), γ (gamma)-butyrolactone (GBL), dimethyl formamide (DMF), dimethyl acetamide (DMAc), tetrahydrofuran (THF), 2-butyl cellusolve, and the like, N,N-dimethyl acetamide, N,N-dimethyl formamide, dimethyl sulfoxide, and meta cresol, phenol, halgenated phenol, and the like. The solvent may appropriately include an aprotic solvent.

In addition, the solvent may further include a poor solvent. Examples of poor solvents include without limitation alcohols, ketones, esters, ethers, hydrocarbons, and halogenated hydrocarbon solvents, as long as the soluble polyimide is not deposited. The poor solvent can lower surface energy of a liquid crystal photo-alignment agent and improve spreadability and flatness when the liquid crystal photo-alignment agent is coated.

The poor solvent may be included in an amount of 1 to 90 volume % based on the total amount of the solvent. In another embodiment, it may be included in an amount of 1 to 70 volume %.

Examples of the poor solvent include without limitation methanol, ethanol, 2-butoxy ethanol, isopropanol, cyclohexanol, ethylene glycol, propylene glycol, 1,4-butanediol, triethylene glycol, acetone, methylethylketone, cyclohexanone, methyl acetate, ethyl acetate, butyl acetate, diethyl hydroxide, malonic acid ester, diethyl ether, ethylene glycol monomethyl ether, ethylene glycol monoethyl ether, ethylene glycol phenyl ether, ethylene glycol phenyl methyl ether, ethylene glycol phenyl ethyl ether, ethylene glycol dimethylethyl, diethylene glycol dimethylethyl, diethyleneglycol ether, diethyleneglycol monomethyl ether, diethylene glycol monoethyl ether, diethylene glycol monomethyl ether acetate, diethylene glycol monoethyl ether acetate, ethylene glycol methyl ether acetate, ethylene glycol ethyl ether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl methyl butanoate, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloro ethane, chlorobenzene, o-dichlorobenzene, hexane, heptane, octane, benzene, toluene, xylene, and combinations thereof.

The amount of the solvent is not limited in the liquid crystal photo-alignment agent, but according to one embodiment of the present invention, the liquid crystal photo-alignment agent may include a solid content ranging from 1 to 30 wt %. In another embodiment, the solid content ranges from 2 to 15 wt %, and in a further embodiment, it ranges from 4 to 10 wt %. When the liquid crystal photo-alignment agent includes a solid content in an amount within these ranges, it may prevent uniformity deterioration of a layer due to high viscosity during the printing and bring about appropriate transmittance. Accordingly, a liquid crystal photo-alignment agent layer may maintain appropriate uniformity and viscosity, since it may have no influence from the surface of a substrate.

According to one embodiment of the present invention, a liquid crystal photo-alignment agent may further include an epoxy compound, a silane coupling agent, a surfactant, or the like, or a combination thereof. The epoxy compound may improve reliability and electric/optical characteristics, and may include more than one epoxy compound having 2 to 8 epoxy groups, for example, 4 epoxy groups.

The liquid crystal photo-alignment agent may include the epoxy compound in an amount ranging from 0.01 to 50 parts by weight, for example from 1 to 30 parts by weight, based on 100 parts by weight of the liquid crystal photo-alignment agent. When the liquid crystal photo-alignment agent includes the epoxy compound in an amount within these ranges, the liquid crystal photo-alignment agent may exhibit appropriate printing property and flatness when coated on a substrate, which can improve reliability and electric/optical characteristics.

Examples of the epoxy compound may include a compound represented by the following Chemical Formula 25, but is not limited thereto.

[Chemical Formula 25]

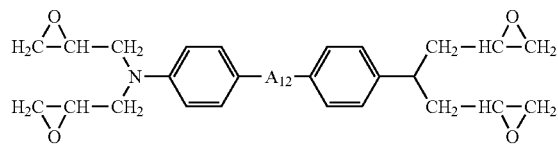

In Chemical Formula 25, $A_{12}$ is a substituted or unsubstituted C6 to C12 aromatic organic group, a substituted or unsubstituted divalent C6 to C12 alicyclic organic group, or a substituted or unsubstituted divalent C6 to C12 aliphatic organic group, for example, a substituted or unsubstituted C1 to C6 alkylene group.

Examples of the epoxy compound include N,N,N',N'-tetraglycidyl-4,4'-diaminodiphenylmethane (TGDDM), N,N,N',N'-tetraglycidyl-4,4'-diaminodiphenylethane, N,N,N',N'-tetraglycidyl-4,4'-diaminodiphenylpropane, N,N,N',N'-tetraglycidyl-4,4'-diaminodiphenylbutane, N,N,N',N'-tetraglycidyl-4,4'-diaminobenzene, ethyleneglycoldiglycidylether, polyethyleneglycoldiglycidylether, propyleneglycoldiglycidylether, tripropyleneglycoldiglycidylether, polypropyleneglycoldiglycidylether, neopentylglycoldiglycidylether, 1,6-hexanediolglycidylether, glycerinediglycidylether, 2,2-d ibromoneopentylglycold iglycidylether, 1,3,5,6-tetraglycidyl-2,4-hexanediol, N,N,N',N'-tetraglycidyl-1,4-phenylenediamine, N,N,N',N'-tetraglycidyl-m-xylenediamine, N,N,N',N'-tetraglycidyl-2,2'-dimethyl-4,4'-diaminobiphenyl, 2,2-bis[4-(N,N-diglycidyl-4-aminophenoxy)phenyl]propane, N,N,N',N'-tetraglycidyl-4,4'-diaminodiphenylmethane, 1,3-bis(N,N-diglycidylaminomethyl)cyclohexane, 1,3-bis(N,N-diglycidylaminomethyl)benzene, and the like, but are not limited thereto.

The silane coupling agent or surfactant may improve adherence to a substrate, which can improve flatness and coating properties of a layer.

According to one embodiment of the present invention, a liquid crystal photo-alignment agent may have viscosity ranging from 3 to 35 cps, for example, from 5 to 25 cps. When the liquid crystal photo-alignment agent has viscosity within these ranges, the liquid crystal photo-alignment agent may exhibit improved uniformity and coating property of a layer.

According to another embodiment of the present invention, a liquid crystal photo-alignment layer is prepared by disposing the liquid crystal photo-alignment agent onto a substrate.

The liquid crystal photo-alignment layer may be disposed by coating the liquid crystal photo-alignment agent on a substrate using conventional coating techniques. Exemplary methods for coating the liquid crystal photo-alignment agent on a substrate may include without limitation spin coating, flexo printing, Inkjet printing, and the like. The skilled artisan will understand and appreciate how to coat the liquid crystal photo-alignment agent onto a substrate without undue experimentation. In exemplary embodiments, the liquid crystal photo-alignment agent is coated onto a substrate using flexo printing, which can provide excellent film uniformity and may easily form a large-size.

The substrate may include any substrate as long as it has high transparency, and may include a glass substrate or a plastic substrate such as an acrylic substrate or a polycarbonate substrate. In addition, when it includes a substrate formed with an ITO electrode for driving liquid crystal, the process may be simplified.

After uniformly coating the liquid crystal photo-alignment agent on a substrate to improve film uniformity, the film be pre-dried at a temperature of between room temperature and 200° C. for 1 to 100 minutes. In another embodiment, the pre-drying may be performed at a temperature of between 30 and 150° C., and in a further embodiment, at a temperature of between 40 and 120° C. The pre-drying process may provide a uniform film having less deviation by adjusting volatilization of each component.

Subsequently, the film is baked at a temperature of 80 to 300° C. or 120 to 280° C. for 5 to 300 minutes to completely evaporate the solvent, preparing a liquid crystal photo-alignment layer.

The obtained liquid crystal photo-alignment layer is aligned in one axis alignment by polarization with ultraviolet (UV) irradiation, or may be used for a liquid crystal display (LCD) with no axis alignment in some applications such as a vertical alignment layer.

The liquid crystal photo-alignment layer according to one embodiment is exposed by light with energy ranging from 10 mJ to 5000 mJ for 0.1 to 180 minutes to be aligned in one axis.

Still another embodiment of the present invention provides a display device including the liquid crystal photo-alignment layer. The display device may include a liquid crystal display (LCD).

FIG. 1 is a cross-sectional view showing a liquid crystal display (LCD) according to one embodiment of the present invention.

As shown in FIG. 1, a liquid crystal display (LCD) 1 according to one embodiment of the present invention includes a lower panel 100, an upper panel 200, and a liquid crystal layer 3.

In the lower panel 100, a gate conductor including a plurality of gate lines (not shown) and a plurality of storage electrodes 133 are formed on the front surface of a first substrate 110. On the gate conductor, a gate insulating layer 140, a plurality of semiconductors 154, a plurality of pairs of ohmic contacts 163 and 165, a plurality of source electrodes 173, and a plurality of drain electrodes 175 are sequentially formed.

One thin film transistor (TFT) consists of one gate electrode 124, one source electrode 173, and one drain electrode 175 together with a semiconductor 154.

A passivation layer 180 is formed on the exposed portion of the semiconductor 154, the source electrode 173, the drain electrode 175, and the gate insulating layer 140. On the passivation layer 180, a plurality of pixel electrodes 191 are formed.

Hereinafter, the upper panel 200 is described.

In the upper panel 200, a light blocking member 220 is formed on a second substrate 210. A plurality of color filters 230 are formed on the second substrate 210 and the light blocking member 220, and an overcoat 250 is formed on the color filter 230. The overcoat 250 is to prevent the color filter 230 from being exposed to the liquid crystal layer 3, but may be omitted.

A first liquid crystal photo-alignment layer 12 is formed on the surface of the pixel electrode 191 of the lower panel 100, and a second liquid crystal photo-alignment layer 22 is formed on the surface of a common electrode 270 of the upper panel 200. The first liquid crystal photo-alignment layer 12 and the second liquid crystal photo-alignment layer 22 are fabricated by using the liquid crystal photo-alignment agent according to one embodiment of the present invention.

Even though the liquid crystal photo-alignment layers 12 and 22 are shown to be respectively formed on the lower panel 100 and the upper panel 200 in FIG. 1, the liquid crystal photo-alignment layers 12 or 22 may be formed on either of the upper panel 200 or the lower panel 100.

Hereinafter, the embodiments are illustrated in more detail with reference to examples. However, the following are exemplary embodiments and are not limiting.

EXAMPLES

Example 1

Preparation of a Liquid Crystal Photo-Alignment Agent Including Polyamic Acid (PAA-1)

0.5 mol of 4-(4,4,4-trifluorobutoxy)-benzoic acid-4-{2-[2-(2,4-diaminophenyl)-ethoxycarbonyl]-vinyl}-phenyl ester represented by the following Chemical Formula 26 is put in a four-neck flask mounted with an agitator, a temperature controller, a nitrogen gas injector, and a condenser in a dark room while nitrogen is passed therethrough, and N-methyl-2-pyrrolidone (NMP) is added thereto, preparing a mixed solution.

Next, 1.0 mol of 4,10-dioxa-tricyclo[6.3.1.0$^{2,7}$]dodecane-3,5,9,11-tetraone in a solid state is added to the mixed solution. The resulting mixture is intensely agitated for one hour. Then, 0.45 mol of 4-(4,4,4-trifluorobutoxy)-benzoic acid-4-{2-[2-(2,4-diamino-phenyl)ethoxycarbonyl]-vinyl}-phenyl ester represented by the above Chemical Formula 26 and 0.05 mol of 4-octadecyloxybenzene-1,3-diamine represented by the following Chemical Formula 27 are added to the above resulting product for reaction. While the temperature is maintained at 25° C., the reactant is reacted for 24 hours to prepare a polyamic acid (PAA-1) solution. The polyamic acid (PAA-1) solution is distilled to prepare polyamic acid (PAA-1). The polyamic acid (PAA-1) has a weight average molecular weight of about 200,000.

The polyamic acid (PAA-1) is put in a mixed solvent of N-methyl-2-pyrrolidone (NMP), γ-butyrolactone, and 2-butyl cellosolve mixed in a volume ratio of 3:4:3. The mixture is agitated at room temperature for 24 hours, preparing a liquid crystal photo-alignment agent including polyamic acid (PAA-1).

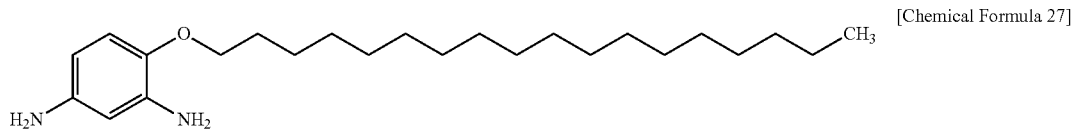 [SMILES: CCCCCCCCCCCCCCCCCCOc1ccc(N)cc1N]

[Chemical Formula 27]

Examples 2 to 10

Preparation of a Liquid Crystal Photo-Alignment Agent Including Polyamic Acids PAA-2 to PAA-10

Liquid crystal photo-alignment agents including polyamic acids (PAA-2 to PAA-10) respectively having a weight average molecular weight of 200,000 are prepared according to the same method as Example 1, except for using 4-(4,4,4-trifluoro butoxy)-benzoic acid-4-{2-[2-(2,4-diaminophenyl)-ethoxycarbonyl]-vinyl}-phenyl ester represented by the above Chemical Formula 26 and 4-octadecyloxybenzene-1,3-diamine represented by the above Chemical Formula 27 as shown in the following Table 1. In the following Table 1, the amount of 4-(4,4,4-trifluoro butoxy)-benzoic acid 4-{2-[2-(2,4-diamino-phenyl)-ethoxycarbonyl]-vinyl}-phenyl ester represented by Chemical Formula 26 is the sum of primary and secondary addition amounts. The primary amount is 0.5 mol in all examples.

Example 11

Preparation of a Liquid Crystal Photo-Alignment Agent Including Polyimide PI-11

A solution is prepared by mixing 0.5 mol of 4-(4,4,4-trifluorobutoxy)-benzoic acid-4-{2-[2-(2,4-diamino-phenyl)

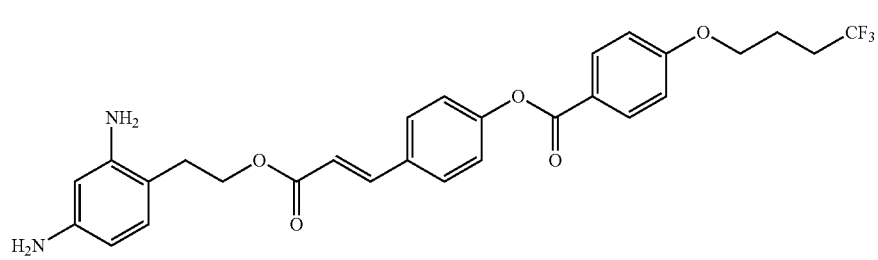

[Chemical Formula 26]

ethoxycarbonyl]-vinyl}-phenyl ester represented by the above Chemical Formula 26 and N-methyl-2-pyrrolidone (NMP) in a four-neck flask mounted with an agitator, a temperature controller, a nitrogen gas injector, and a condenser while nitrogen is passed therethrough in a dark room.

Next, 1.0 mol of 4,10-dioxa-tricyclo[6.3.1.0$^{2,7}$]dodecane-3,5,9,11-tetraone in a solid state is put in the mixed solution. The resulting mixture is intensely agitated for 1 hour. Then, 0.45 mol of 4-(4,4,4-trifluorobutoxy)-benzoic acid-4-{2-[2-(2,4-diamino-phenyl)ethoxycarbonyl]-vinyl}-phenyl ester represented by the above Chemical Formula 26 and 0.05 mol of 4-octadecyloxybenzene-1,3-diamine represented by the above Chemical Formula 27 are added thereto for reaction. While the temperature is maintained at 25° C., the resulting mixture is reacted for 24 hours, preparing a polyamic acid solution.

Then, 3.0 mol of an acetic acid anhydride catalyst and 5.0 mol of a pyridine catalyst are added to the polyamic acid solution. The cyclization reaction is performed at 80° C. for 4 hours. The reaction product is vacuum-distilled to remove the acetic acid anhydride catalyst, the pyridine catalyst, and the NMP solvent, preparing polyimide (PI-11). The polyimide (PI-11) has a weight average molecular weight of 200,000.

The polyimide PI-11 is added to a solvent of N-methyl-2-pyrrolidone (NMP), γ-butyrolactone, and 2-butyl cellosolve mixed in a volume ratio of 3:4:3. The resulting mixture is agitated at room temperature for 24 hours, preparing a liquid crystal photo-alignment agent including the polyimide (PI-11).

Examples 12 to 20

Preparation of a Liquid Crystal Photo-Alignment Agent Including Polyimide (PI-12 to PI-20)

A liquid crystal photo-alignment agent including polyimides PI-12 to PI-20 respectively having a weight average molecular weight of 200,000 is prepared according to the same method as Example 11, except for using 4-(4,4,4-trifluoro butoxy)-benzoic acid-4-{2-[2-(2,4-diaminophenyl)-ethoxycarbonyl]-vinyl}-phenyl ester represented by the above Chemical Formula 26 and 4-octadecyloxybenzene-1,3-diamine represented by the above Chemical Formula 27 as shown in the following Table 1. In the following Table 1, 4-(4,4,4-trifluoro butoxy)-benzoic acid 4-{2-[2-(2,4-diamino-phenyl)-ethoxycarbonyl]-vinyl}-phenyl ester represented by Chemical Formula 26 is used in sum of primary and secondary addition amounts. The primary amount is 0.5 mol in all examples.

Comparative Example 1

Preparation of a Liquid Crystal Photo-Alignment Agent Including Polyamic Acid (PAA-1C)

A solution is prepared by adding 0.5 mol of 4-(4,4,4-trifluorobutoxy)-benzoic acid-4-{2-[2-(2,4-diamino-phenyl) ethoxycarbonyl]-vinyl}-phenyl ester represented by the above Chemical Formula 26 to N-methyl-2-pyrrolidone (NMP) in a four-neck flask mounted with an agitator, a temperature controller, a nitrogen gas injector, and a condenser while nitrogen is passed therethrough in a dark room.

The mixed solution is mixed with 1.0 mol of 4,10-dioxatricyclo[6.3.1.0$^{2,7}$]dodecane-3,5,9,11-tetraone in a solid state. The resulting mixture is intensely agitated for one hour. Next, 0.5 mol of 4-(4,4,4-trifluorobutoxy)-benzoic acid-4-{2-[2-(2,4-diamino-phenyl)ethoxycarbonyl]-vinyl}-phenyl ester represented by the above Chemical Formula 26 is added thereto for reaction. Then, while the temperature is maintained at 25° C., the resulting mixture is reacted for 24 hours to prepare a polyamic acid (PAA-1C) solution. The polyamic acid (PAA-1C) solution is distilled, preparing polyamic acid (PAA-1C). The polyamic acid (PAA-1C) has a weight average molecular weight of 200,000.

The polyamic acid (PAA-1C) is added to a solvent of N-methyl-2-pyrrolidone (NMP), γ-butyrolactone, and 2-butyl cellosolve mixed in a volume ratio of 3:4:3. The resulting mixture is agitated at room temperature for 24 hours, preparing a liquid crystal alignment agent including polyamic acid (PAA-1C).

Comparative Example 2

Preparation of a Liquid Crystal Photo-Alignment Agent Including Polyimide (PI-2C)

A solution is prepared by mixing 0.5 mol of 4-(4,4,4-trifluorobutoxy)-benzoic acid-4-{2-[2-(2,4-diamino-phenyl) ethoxycarbonyl]-vinyl}-phenyl ester represented by the above Chemical Formula 26 with N-methyl-2-pyrrolidone (NMP) in a four-neck flask mounted with an agitator, a temperature controller, a nitrogen gas injector, and a condenser, while nitrogen is passed therethrough in a dark room.

The mixed solution is mixed with 1.0 mol of 4,10-dioxatricyclo[6.3.1.0$^{2,7}$]dodecane-3,5,9,11-tetraone in a solid state. The mixture is intensely agitated for one hour. Next, 0.5 mol of 4-(4,4,4-trifluorobutoxy)-benzoic acid-4-{2-[2-(2,4-diamino-phenyl)ethoxycarbonyl]-vinyl}-phenyl ester represented by the above Chemical Formula 26 is added thereto for reaction. While the temperature is maintained at 25° C., the resulting mixture is reacted for 24 hours, preparing a polyamic acid solution.

The polyamic acid solution is mixed with 3.0 mol of acetic acid anhydride and 5.0 mol of pyridine. The cyclization reaction is performed at 80° C. for 6 hours. The resulting product is vacuum-distilled to remove the catalyst and the solvent, acquiring polyimide (PI-20). The polyimide (PI-20) has a weight average molecular weight of 200,000.

The polyimide (PI-2C) is added to a solution of N-methyl-2-pyrrolidone (NMP), γ-butyrolactone, and 2-butyl cellosolve mixed in a volume ratio of 3:4:3. The mixture is agitated at room temperature for 24 hours, preparing a liquid crystal photo-alignment agent including polyimide (PI-20).

TABLE 1

| Liquid crystal photo-alignment agent | Polymer | Using amount of Chemical Formula 26 (mole) | Using amount of Chemical Formula 27 (mole) | Solid content of liquid crystal photo-alignment agent (wt %) | Viscosity of liquid crystal photo-alignment agent (cps) |
|---|---|---|---|---|---|
| Example 1 | PAA-1 | 0.95 | 0.05 | 6.5 | 23.1 |
| Example 2 | PAA-2 | 0.90 | 0.10 | 6.5 | 25.6 |
| Example 3 | PAA-3 | 0.85 | 0.15 | 6.5 | 23.8 |
| Example 4 | PAA-4 | 0.80 | 0.20 | 6.5 | 23.7 |
| Example 5 | PAA-5 | 0.75 | 0.25 | 6.5 | 23.4 |
| Example 6 | PAA-6 | 0.70 | 0.30 | 6.5 | 25.6 |
| Example 7 | PAA-7 | 0.65 | 0.35 | 6.5 | 26.4 |
| Example 8 | PAA-8 | 0.60 | 0.40 | 6.5 | 24.6 |
| Example 9 | PAA-9 | 0.55 | 0.45 | 6.5 | 25.7 |
| Example 10 | PAA-10 | 0.50 | 0.50 | 6.5 | 23.9 |
| Example 11 | PI-11 | 0.95 | 0.05 | 6.5 | 23.1 |
| Example 12 | PI-12 | 0.90 | 0.10 | 6.5 | 25.6 |

TABLE 1-continued

| Liquid crystal photo-alignment agent | Polymer | Using amount of Chemical Formula 26 (mole) | Using amount of Chemical Formula 27 (mole) | Solid content of liquid crystal photo-alignment agent (wt %) | Viscosity of liquid crystal photo-alignment agent (cps) |
|---|---|---|---|---|---|
| Example 13 | PI-13 | 0.85 | 0.15 | 6.5 | 23.8 |
| Example 14 | PI-14 | 0.80 | 0.20 | 6.5 | 23.7 |
| Example 15 | PI-15 | 0.75 | 0.25 | 6.5 | 23.4 |
| Example 16 | PI-16 | 0.70 | 0.30 | 6.5 | 25.6 |
| Example 17 | PI-17 | 0.65 | 0.35 | 6.5 | 24.4 |
| Example 18 | PI-18 | 0.60 | 0.40 | 6.5 | 24.6 |
| Example 19 | PI-19 | 0.55 | 0.45 | 6.5 | 25.7 |
| Example 20 | PI-20 | 0.50 | 0.50 | 6.5 | 23.9 |
| Comparative Example 1 | PAA-1C | 1.0 | 0 | 6.5 | 23.1 |
| Comparative Example 2 | PI-2C | 1.0 | 0 | 6.5 | 23.2 |

Property Evaluation

Liquid Crystal Photo-Alignment Property and Pretilt Angle Evaluation

Liquid crystal cells are fabricated to evaluate the liquid crystal photo-alignment properties of the liquid crystal photo-alignment agents. The liquid crystal cells are prepared as follows.

Standard-sized ITO glass substrates are patterned in a photolithography method to remove all except for a 1.5 cm×1.5 cm square ITO shape and an electrode ITO shape for applying a voltage.

The liquid crystal alignment agents according to Examples 1 to 20 and Comparative Examples 1 and 2 are spin coated onto patterned ITO substrates to a thickness of 0.1 μm, and then cured at 70° C. and 210° C.

The cured ITO substrates are exposed to light at a predetermined angle under predetermined energy using an exposer (UIS-S2021J7-YD01, Ushio LPUV). Two exposed substrates are united in an opposite exposure direction (VA mode, 90°), maintaining a cell gap of 4.75 μm and overlapping the square ITO shapes on bottom and top. The exposure is performed using a 2 kW-deep UV lamp (deep UV ramp, UXM-2000) as a light source.

Each cell is filled with liquid crystal. Then, the liquid crystal photo-alignment properties of each cell are evaluated using a perpendicular-polarized optical microscope. Also the pretilt angle of each cell is measured using a crystal rotation method.

Electrical Characteristic Evaluation of a Liquid Crystal Photo-Alignment Layer

Electrical characteristics of each liquid crystal photo-alignment layer are evaluated by measuring voltage transmission using a liquid crystal cell of a 4.75 μm cell gap, a voltage holding ratio (VHR) at room temperature and 60° C., and residual DC (RDC) voltage.

The voltage holding ratio indicates how much charged voltage a liquid crystal floated with external power may maintain during a non-selected period in a TFT-LCD of an active matrix method. It is ideal for the value to be close to 100%.

The residual DC voltage indicates a voltage applied in a liquid crystal layer without an externally-applied voltage, since ionized impurities of the liquid crystal layer are absorbed in an alignment layer. The lower the value, the better it is. The residual DC voltage is measured in a method of using a flicker, an electrical capacity change curved line (C-V) of a liquid crystal layer depending on DC voltage, and the like.

The electrical and optical characteristic evaluation results of the liquid crystal photo-alignment layers included in the liquid crystal cells are provided in the following Table 2. Herein, references for evaluating the liquid crystal photo-alignment property and the voltage transmission are as follows.

Reference for Evaluating Liquid Crystal Photo-Alignment Property
  Good: no disclination generation
  Bad: disclination generation
Voltage Transmission Evaluation Reference
  Good: 99% or more
  Bad: less than 99%

TABLE 2

| Liquid crystal photo-alignment agent | Liquid crystal photo-alignment property | Voltage transmission | Voltage holding ratio (%) | | Residual DC voltage (by C-V) (mV) | Pretilt angle (°) | Pretilt angle after 168 hours operation (°) |
|---|---|---|---|---|---|---|---|
| | | | Room temperature 25° C. | High temperature 60° C. | | | |
| Example 1 | Good | Good | 99.55 | 99.32 | 50 | 89.01 | 88.99 |
| Example 2 | Good | Good | 99.51 | 99.28 | 51 | 89.05 | 89.02 |
| Example 3 | Good | Good | 99.52 | 99.26 | 45 | 89.05 | 89.05 |
| Example 4 | Good | Good | 99.48 | 99.18 | 60 | 89.12 | 89.06 |
| Example 5 | Good | Good | 99.51 | 99.16 | 58 | 89.27 | 89.15 |
| Example 6 | Good | Good | 99.56 | 99.15 | 61 | 89.28 | 89.17 |
| Example 7 | Good | Good | 99.47 | 99.12 | 55 | 89.43 | 89.32 |
| Example 8 | Good | Good | 99.41 | 99.10 | 48 | 89.42 | 89.33 |
| Example 9 | Good | Good | 99.46 | 99.16 | 46 | 89.56 | 89.52 |
| Example 10 | Good | Good | 99.42 | 99.15 | 59 | 89.54 | 89.45 |
| Example 11 | Good | Good | 99.55 | 99.32 | 51 | 87.5 | 87.4 |
| Example 12 | Good | Good | 99.51 | 99.28 | 48 | 87.5 | 87.4 |
| Example 13 | Good | Good | 99.52 | 99.26 | 60 | 87.5 | 87.5 |
| Example 14 | Good | Good | 99.48 | 99.18 | 58 | 87.7 | 87.6 |

TABLE 2-continued

| Liquid crystal photo-alignment agent | Liquid crystal photo-alignment property | Voltage transmission | Voltage holding ratio (%) | | Residual DC voltage (by C-V) (mV) | Pretilt angle (°) | Pretilt angle after 168 hours operation (°) |
|---|---|---|---|---|---|---|---|
| | | | Room temperature 25° C. | High temperature 60° C. | | | |
| Example 15 | Good | Good | 99.51 | 99.17 | 61 | 87.7 | 87.65 |
| Example 16 | Good | Good | 99.56 | 99.15 | 55 | 87.8 | 87.7 |
| Example 17 | Good | Good | 99.47 | 99.14 | 46 | 88.13 | 88.12 |
| Example 18 | Good | Good | 99.41 | 99.10 | 46 | 88.32 | 88.32 |
| Example 19 | Good | Good | 99.46 | 99.10 | 59 | 88.56 | 88.52 |
| Example 20 | Good | Good | 99.55 | 99.32 | 50 | 87.7 | 88.65 |
| Comparative Example 1 | Good | Good | 98.51 | 97.31 | 332 | 89.0 | 88.8 |
| Comparative Example 2 | Good | Good | 98.38 | 97.08 | 401 | 87.5 | 87.3 |

As shown in Table 2, the liquid crystal photo-alignment agents of Examples 1 to 20 have excellent liquid crystal photo-alignment and voltage transmission as compared to the ones of Comparative Examples 1 and 2.

In addition, the liquid crystal photo-alignment agents of Examples 1 to 20 have better voltage holding ratios and residual DC voltages than the ones of Comparative Examples 1 and 2.

As for the pretilt angle, the liquid crystal photo-alignment agents of Examples 1 to 20 are similar to or better than the ones of Comparative Examples 1 and 2. The liquid crystal photo-alignment agents of Examples 1 to 20 have no or little pretilt change ranging from 0° to 0.12° after 168 hours of operation, and thus maintain excellent vertical alignment. On the other hand, since the liquid crystal photo-alignment agents of Comparative Examples 1 and 2 have a large pretilt angle change of 0.2° after 168 hours of operation, they do not maintain vertical alignment after the operation well.

Comparative Example 3

Preparation of a Liquid Crystal Photo-Alignment Agent Including Polyamic Acid (PAA-3C)

0.5 mol of 4-(4,4,4-trifluoro butoxy)-benzoic acid 4-{2-[2-2,4-diamino-phenyl]-ethoxycarbonyl]-vinyl}-phenyl ester represented by the above Chemical Formula 26 is put in a four-neck flask mounted with an agitator, a temperature controller, a nitrogen gas injector, and a condenser while nitrogen is passed therethrough in a dark room, and then N-methyl-2-pyrrolidone (NMP) is added thereto to dissolve the compound of the above Chemical Formula 26 therein.

Next, 1.0 mol of 4,10-dioxa-tricyclo[6.3.1.0$^{2,7}$]dodecane-3,5,9,11-tetraone (referred to as "2,3,5-tricarboxylcyclopentyl acetic acid anhydride") in a solid state is added to the above solution. The mixture is intensely agitated.

After agitation for one hour, 0.5 mol of 4-(4,4,4-trifluoro butoxy)-benzoic acid 4-{2-[2-(2,4-diamino-phenyl)ethoxycarbonyl]-vinyl}-phenyl ester represented by the following Chemical Formula 26 is added thereto, and then reacted up to an appropriate viscosity of about 150 cps.

The prepared solution includes a solid content of 30 wt % and is copolymerized for 24 hours, while maintaining the temperature at 45° C., preparing a polyamic acid (PAA-3C) solution.

The polyamic acid (PAA-3C) solution is distilled, acquiring pure polyamic acid. The polyamic acid has a weight average molecular weight of about 200,000. The polyamic acid is added to an organic solvent of N-methyl-2-pyrrolidone (NMP), γ-butyrolactone, and 2-butyl celusolve mixed in a volume ratio of 3:4:3. The mixture is agitated at room temperature for 24 hours, preparing a liquid crystal photo-alignment agent including polyamic acid (PAA-3C). The liquid crystal photo-alignment agent includes 6.5 wt % of a solid.

Example 21

Preparation of a Liquid Crystal Photo-Alignment Agent Including Polyamic Acid (PAA-21)

0.5 mol (primary addition) of 4-(4,4,4-trifluorobutoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room while nitrogen is passed therethrough. Then, N-methyl-2-pyrrolidone (NMP) is added thereto to dissolve the compound represented by the above Chemical Formula 26 therein.

The solution is mixed with 1.0 mol of solid 4,10-dioxa-tricyclo[6.3.1.0$^{2,7}$]dodecane-3,5,9,11-tetraone (referred to as "2,3,5-tricarboxylcyclopentyl acetic acid anhydride"). The mixture is intensely agitated.

After 1 hour of agitation, the agitated product is mixed with 0.3 mol (secondary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 0.1 mol of 3,5-diaminobenzoate-3-cholestanol represented by the following Chemical Formula 8, and 0.1 mol of paradiaminebenzene represented by the following Chemical Formula 28. The mixture is reacted up to an appropriate viscosity of about 150 cps.

The prepared solution includes a solid content of about 30 wt %, and is copolymerized for 24 hours, while the temperature is maintained at 45° C., preparing a polyamic acid (PAA-21) solution.

[Chemical Formula 8]

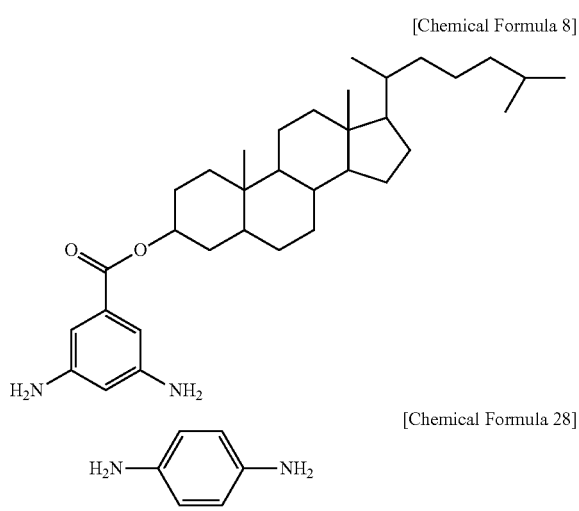

[Chemical Formula 28]

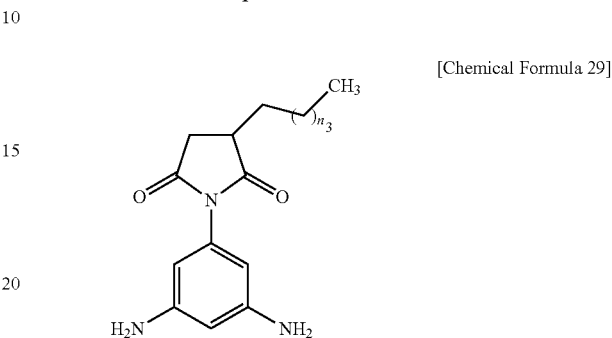

The polyamic acid (PAA-21) solution is distilled, preparing a pure polyamic acid. The polyamic acid has a weight average molecular weight of about 200,000. The polyamic acid is added to an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including polyamic acid (PAA-21). The liquid crystal photo-alignment agent includes a solid content of 6.5 wt %.

Examples 22 to 25

Preparation of a Liquid Crystal Photo-Alignment Agent Including Polyamic Acids (PAA-22 to PAA-25)

A liquid crystal photo-alignment agent is prepared according to the same method as Example 21, except for using 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 3,5-diaminobenzoate-3-cholestanol represented by the above Chemical Formula 8, and paradiaminebenzene represented by the above Chemical Formula 28 in an amount shown in the following Table 3, preparing polyamic acids (PAA-22 to PAA-25). All of the liquid crystal photo-alignment agents include a solid content of 6.5 wt %.

The amount of 4-(4,4,4-trifluoro butoxy)-benzoic acid 4-{2-[2-(2,4-diamino-phenyl)-ethoxycarbonyl]-vinyl}-phenyl ester represented by Chemical Formula 26 provided in Table 3 is the sum of primary and secondary addition amounts. The primary amount in all examples is 0.5 mol.

Examples 26 to 30

Preparation of a Liquid Crystal Photo-Alignment Agent Including Polyamic Acids (PAA-26 to PAA-30)

A liquid crystal photo-alignment agent is prepared according to the same method as Example 21, except for using 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 1-(3,5-diaminophenyl)-3-octadecylsuccinimide represented by the following Chemical Formula 29, and paradiaminebenzene represented by the above Chemical Formula 28 in an amount provided in the following Table 3, preparing polyamic acids (PAA-27 to 30). All of the liquid crystal photo-alignment agents include a solid content of 6.5 wt %.

In Table 3, the amount of 4-(4,4,4-trifluoro butoxy)-benzoic acid 4-{2-[2-(2,4-diamino-phenyl)-ethoxycarbonyl]-vinyl}-phenyl ester represented by Chemical Formula 26 is the sum of primary and secondary additions. The primary amount is 0.5 mol in all examples.

[Chemical Formula 29]

In Chemical Formula 29, n3 is 16.

Comparative Example 4

Preparation of a Liquid Crystal Photo-Alignment Agent Including Polyimide (PI-4C)

0.5 mol of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room while nitrogen is passed therethrough, and N-methyl-2-pyrrolidone (NMP) is added thereto to dissolve the compound represented by the above Chemical Formula 26 therein.

This solution is mixed with 1.0 mol of 4,10-dioxa-tricyclo [6.3.1.0$^{2,7}$]dodecane-3,5,9,11-tetraone (referred to as "2,3,5-tricarboxylcyclopentyl acetic acid anhydride") in a solid state. Then, the mixture is intensely agitated.

After one hour of agitation, 0.5 mol of 4-(4,4,4-trifluoro butoxy)-benzoic acid 4-{2-[2-(2,4-diamino-phenyl)ethoxycarbonyl]-vinyl}-phenyl ester represented by the above Chemical Formula 26 is added thereto. The mixture is reacted up to an appropriate viscosity (about 150 cps).

The prepared solution includes a solid content of about 30 wt % and is copolymerized for 24 hours at 50° C., preparing a polyamic acid solution.

The polyamic acid solution is mixed with 3.0 mol of an acetic acid anhydride catalyst and 5.0 mol of a pyridine catalyst. This mixture is heated to 80° C. and reacted for 6 hours. The reaction product is vacuum-distilled to remove the acetic acid anhydride catalyst, the pyridine catalyst, and the NMP solvent, preparing a soluble polyimide (PI-4C) solution including a solid content of 20 wt %.

The soluble polyimide (PI-4C) solution is distilled, preparing pure soluble polyimide (PI-4C) having a weight average molecular weight of 200,000. The soluble polyimide (PI-4C) is put in an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including the soluble polyimide (PI-4C). The liquid crystal photo-alignment agent includes a solid content of 6.5 wt %.

Example 31

Preparation of a Liquid Crystal Photo-Alignment Agent Including Polyimide PI-31

0.5 mol (primary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room while nitrogen is passed therethrough, and N-methyl-2-pyrrolidone (NMP) is added thereto to dissolve a compound represented by the above Chemical Formula 26 therein.

The solution is mixed with 1.0 mol of 4,10-dioxa-tricyclo[6.3.1.0$^{2,7}$]dodecane-3,5,9,11-tetraone (referred to as "2,3,5-tricarboxylcyclopentyl acetic acid anhydride") in a solid state. The mixture is intensely agitated.

After one hour of agitation, the agitated product is mixed with 0.3 mol (secondary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 0.1 mol of 3,5-diaminobenzoate-3-cholestanol represented by the above Chemical Formula 8, and 0.1 mol of paradiaminebenzene represented by the above Chemical Formula 28. The mixture is reacted up to an appropriate viscosity of about 150 cps.

The prepared solution includes a solid content of 30 wt % and is reacted for 24 hours at 50° C., preparing a polyamic acid solution.

Next, 3.0 mol of an acetic acid anhydride catalyst and 5.0 mol of a pyridine catalyst are added to the polyamic acid solution. The mixture is heated to 80° C. and reacted for 6 hours. The reaction product is vacuum-distilled to remove the acetic acid anhydride and pyridine catalysts and the NMP solvent, preparing a soluble polyimide PI-31 solution having a solid content of 20 wt %.

The soluble polyimide PI-31 solution is distilled, acquiring pure soluble polyimide PI-31 having a weight average molecular weight of 200,000. The soluble polyimide PI-31 is added to an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including the soluble polyimide PI-31. The liquid crystal photo-alignment agent includes a solid content of 6.5 wt %.

Examples 32 to 35

Preparation of a Liquid Crystal Photo-Alignment Agent Including Polyimide (PI-32 to PI-35)

Polyamic acid is prepared according to the same method as Example 21, except for using 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 3,5-diaminobenzoate-3-cholestanol represented by the above Chemical Formula 8, and paradiaminebenzene represented by the above Chemical Formula 28 in an amount provided in the following Table 3. This polyamic acid is used according to the same method as Example 21 to prepare a liquid crystal photo-alignment agent respectively including polyimides (PI-32 to PI-35) having a weight average molecular weight of 200,000. All of the liquid crystal photo-alignment agents include a solid content of 6.5 wt %.

As shown in Table 3, the amount of 4-(4,4,4-trifluoro butoxy)-benzoic acid 4-{2-[2-(2,4-diamino-phenyl)ethoxycarbonyl]-vinyl}-phenyl ester represented by Chemical Formula 26 is the sum of primary and secondary addition amounts. The primary amount in all examples is 0.5 mol.

Examples 36 to 40

Preparation of a Liquid Crystal Photo-Alignment Agent Including Polyimide (PI-36 to PI-40)

A liquid crystal photo-alignment agent respectively including polyimides (PI-36 to PI-40) is prepared according to the same method as Example 21, except for using 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 1-(3,5-diaminophenyl)-3-octadecyl succinimide represented by the following Chemical Formula 29, and paradiaminebenzene represented by the above Chemical Formula 28 in an amount provided in the following Table 3. All of the liquid crystal photo-alignment agents include a solid content of 6.5 wt %.

In Table 3, the amount of 4-(4,4,4-trifluoro butoxy)-benzoic acid 4-{2-[2-(2,4-diamino-phenyl)-ethoxycarbonyl]-vinyl}-phenyl ester represented by Chemical Formula 26 is the sum of primary and secondary addition amounts. The primary amount in all examples is 0.5 mol.

TABLE 3

| | Preparation Example | Chemical Formula 26 | Chemical Formula 8 | Chemical Formula 29 | Chemical Formula 28 | Type |
|---|---|---|---|---|---|---|
| Comparative Example 3 | PAA-3C | 100 | — | — | — | polyamic acid |
| Example 21 | PAA-21 | 80 | 10 | — | 10 | polyamic acid |
| Example 22 | PAA-22 | 70 | 10 | — | 20 | polyamic acid |
| Example 23 | PAA-23 | 70 | 20 | — | 10 | polyamic acid |
| Example 24 | PAA-24 | 60 | 20 | — | 20 | polyamic acid |
| Example 25 | PAA-25 | 60 | 30 | — | 10 | polyamic acid |
| Example 26 | PAA-26 | 90 | — | 5 | 5 | polyamic acid |
| Example 27 | PAA-27 | 80 | — | 5 | 15 | polyamic acid |
| Example 28 | PAA-28 | 80 | — | 5 | 20 | polyamic acid |
| Example 29 | PAA-29 | 70 | — | 5 | 25 | polyamic acid |
| Example 30 | PAA-30 | 70 | — | 10 | 20 | polyamic acid |
| Comparative Example 4 | PI-4C | 100 | — | — | — | polyimide |
| Example 31 | PI-31 | 80 | 10 | — | 10 | polyimide |
| Example 32 | PI-32 | 70 | 10 | — | 20 | polyimide |
| Example 33 | PI-33 | 70 | 20 | — | 10 | polyimide |
| Example 34 | PI-34 | 60 | 20 | — | 20 | polyimide |
| Example 35 | PI-35 | 60 | 30 | — | 10 | polyimide |
| Example 36 | PI-36 | 90 | — | 5 | 5 | polyimide |

TABLE 3-continued

|  | Preparation Example | Chemical Formula 26 | Chemical Formula 8 | Chemical Formula 29 | Chemical Formula 28 | Type |
|---|---|---|---|---|---|---|
| Example 37 | PI-37 | 80 | — | 5 | 15 | polyimide |
| Example 38 | PI-38 | 80 | — | 5 | 20 | polyimide |
| Example 39 | PI-39 | 70 | — | 5 | 25 | polyimide |
| Example 40 | PI-40 | 70 | — | 10 | 20 | polyimide |

In Table 3, the unit of the amounts of Chemical Formulas 26, 8, 29, and 28 is mol %, which indicates the amount of each used to prepare the polyamic acids, based on the entire number of moles of diamine used to prepare the polyamic acids. In addition, the amounts in mol % of the first, second, and third structural units of the polyimide or polyamic acid are the same as the mol % of a compound represented by the chemical formula.

Property Evaluation

Liquid crystal cells are fabricated according to the same method as Example 1 using the liquid crystal photo-alignment agents according to Examples 21 to 40 and Comparative Examples 2 and 3. The liquid crystal cells are used to measure liquid crystal photo-alignment properties, voltage-transmission, voltage holding ratio, and residual DC according to the same methods as Example 1. The results are provided in the following Table 4.

TABLE 4

| Synthesis Example | Photo-alignment property | Voltage-transmission | Voltage holding ratio (%) Room temperature 25° C. | Voltage holding ratio (%) High temperature 60° C. | RDC (V) |
|---|---|---|---|---|---|
| Comparative Example 3 | Good | Good | 98.51 | 97.31 | 332 |
| Example 21 | Good | Good | 99.51 | 99.30 | 53 |
| Example 22 | Good | Good | 99.49 | 99.26 | 61 |
| Example 23 | Good | Good | 99.50 | 99.29 | 41 |
| Example 24 | Good | Good | 99.47 | 99.23 | 54 |
| Example 25 | Good | Good | 99.52 | 99.25 | 51 |
| Example 26 | Good | Good | 99.53 | 99.28 | 58 |
| Example 27 | Good | Good | 99.53 | 99.24 | 46 |
| Example 28 | Good | Good | 99.49 | 99.18 | 49 |
| Example 29 | Good | Good | 99.51 | 99.21 | 59 |
| Example 30 | Good | Good | 99.53 | 99.24 | 63 |
| Comparative Example 4 | Good | Good | 98.38 | 97.08 | 401 |
| Example 31 | Good | Good | 99.49 | 99.21 | 53 |
| Example 32 | Good | Good | 99.52 | 99.26 | 52 |
| Example 33 | Good | Good | 99.48 | 99.18 | 49 |
| Example 34 | Good | Good | 99.54 | 99.24 | 43 |
| Example 35 | Good | Good | 99.52 | 99.21 | 62 |
| Example 36 | Good | Good | 99.47 | 99.29 | 51 |
| Example 37 | Good | Good | 99.51 | 99.14 | 48 |
| Example 38 | Good | Good | 99.54 | 99.26 | 60 |
| Example 39 | Good | Good | 99.51 | 99.31 | 46 |
| Example 40 | Good | Good | 99.48 | 99.28 | 47 |

Referring to Table 4, the liquid crystal alignment agents according to Examples 21 to 40 have improved voltage holding ratio (VHR) and RDC characteristics as compared to Comparative Examples 3 and 4.

The voltage holding ratio and the residual DC may work as a reference for evaluating an after-image characteristic of a liquid crystal photo-alignment layer. The higher voltage holding ratio and lower residual DC indicates an excellent after-image characteristic. Accordingly, the liquid crystal photo-alignment agents according to Examples 21 to 40 have a better after-image characteristic than the ones of Comparative Examples 3 and 4.

Comparative Example 5

Preparation of a Liquid Crystal Photo-Alignment Agent Including Polyamic acid (PAA-5C)

0.5 mol of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room while nitrogen is passed therethrough, and N-methyl-2-pyrrolidone (NMP) is added thereto to dissolve the compound represented by the above Chemical Formula 26 therein.

The solution is mixed with 1.0 mol of 4,10-dioxa-tricyclo[6.3.1.0$^{2,7}$]dodecane-3,5,9,11-tetraone (referred to as "2,3,5-tricarboxylcyclopentyl acetic acid anhydride"). The mixture is intensely agitated.

After 1 of hour agitation, the agitated product is mixed with 0.5 mol of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26. The mixture is reacted up to an appropriate viscosity of about 150 cps.

The resulting solution includes a solid content of 30 wt % and is copolymerized for 24 hours, while the temperature is maintained at 50° C., preparing a polyamic acid (PAA-5C) solution.

The polyamic acid (PAA-5C) solution is distilled, preparing pure polyamic acid (PAA-5C). The polyamic acid (PAA-5C) has a weight average molecular weight of 200,000. This polyamic acid is added to an organic solvent prepared by mixing N-methyl-2-pyrrolidone (NMP), γ-butyrolactone, and 2-butyl celusolve in a volume ratio of 3:4:3. The resulting mixture is agitated at room temperature for 24 hours, preparing a liquid crystal photo-alignment agent including photo-alignment polyamic acid (PAA-5C). The liquid crystal photo-alignment agent includes a solid content of 6.5 wt %.

Example 41

Preparation of a Liquid Crystal Photo-Alignment Agent Including Polyamic Acid (PAA-41)

0.5 mol (primary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room, while nitrogen is passed therethrough, and N-methyl-2-pyrrolidone (NMP) is added thereto to dissolve the compound represented by the above Chemical Formula 26 therein.

The solution is mixed with 1.0 mol of 4,10-dioxa-tricyclo [6.3.1.0$^{2,7}$]dodecane-3,5,9,11-tetraone (referred to as "2,3,5-tricarboxylcyclopentyl acetic acid anhydride") in a solid state. The mixture is intensely agitated.

After one of hour agitation, the agitated product is mixed with 0.4 mol (secondary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 0.05 mol of 4-(4,4,4-trifluoro butoxy)-benzoic acid 1,1'-[[2,2-bis[(4-aminophenyl)methyl]-1,4-propanedyl]bis[oxy[1E-3-oxo-1-propene-1-yl]-4,1-phenylene]] ester represented by the following Chemical Formula 30, and 0.05 mol of 4-octadecyl oxy benzene-1,3-diamine represented by the above Chemical Formula 27. The mixture is reacted up to an appropriate viscosity of about 150 cps.

The prepared solution includes a solid content of 30 wt % and is copolymerized for 24 hours, while the temperature is maintained at 50° C., preparing a polyamic acid (PAA-41) solution.

The polyamic acid (PAA-41) solution is distilled, preparing pure polyamic acid (PAA-41). The polyamic acid (PAA-41) has a weight average molecular weight of 200,000. This polyamic acid is added to an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including polyamic acid (PAA-41). The liquid crystal photo-alignment agent includes a solid content of 6.5 wt %.

Examples 42 to 50

A Liquid Crystal Photo-Alignment Agent Including Polyamic Acid (PAA-42 to PAA-50)

A liquid crystal photo-alignment agent respectively including polyamic acids PAA-42 to PAA-50 is prepared according to the same method as Example 41, except for using 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 4-(4,4,4-trifluoro butoxy)-benzoic acid 1,1'-[[2,2-bis[(4-aminophenyl)methyl]-1,4-propanedyl]bis[oxy[1E-3-oxo-1-propene-1-yl]-4,1-phenylene]]ester represented by the above Chemical Formula 30, and 4-octadecyl oxy benzene-1,3-diamine represented by the above Chemical Formula 27 in an amount provided in the following Table 5. All of the liquid crystal photo-alignment agents include a solid content of 6.5 wt %.

In Table 5, the amount of 4-(4,4,4-trifluoro butoxy)-benzoic acid 4-{2-[2-(2,4-diamino-phenyl)-ethoxycarbonyl]-vinyl}-phenyl ester represented by Chemical Formula 26 is the sum of primary and secondary addition amounts. The primary addition is 0.5 mol in all examples.

Comparative Example 6

Preparation of a Liquid Crystal Photo-Alignment Agent Including Polyimide (PI-6C)

0.5 mol of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room while nitrogen is passed therethrough, and then N-methyl-2-pyrrolidone (NMP) is added thereto to dissolve the compound therein.

The solution is mixed with 1.0 mol of 4,10-dioxa-tricyclo [6.3.1.0$^{2,7}$]dodecane-3,5,9,11-tetraone (referred to as "2,3,5-

[Chemical Formula 30]

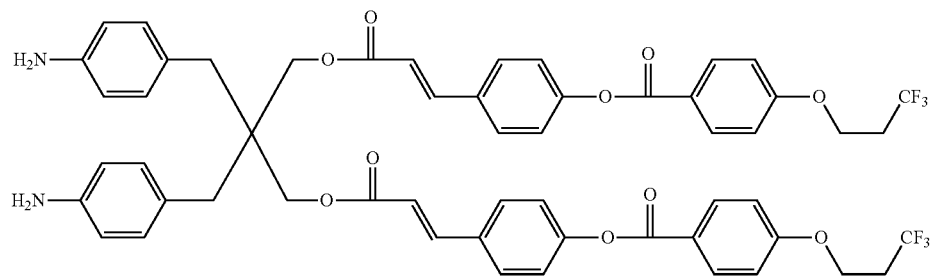

tricarboxylcyclopentyl acetic acid anhydride") in a solid state. The mixture is intensely agitated.

After 1 hour of agitation, 0.5 mol of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is added thereto. The resulting mixture is reacted up to an appropriate viscosity of about 150 cps.

The prepared solution includes a solid content of 30 wt % and is copolymerized for 24 hours at room temperature, preparing a polyamic acid solution.

The polyamic acid solution is mixed with 3.0 mol of an acetic acid anhydride catalyst and 5.0 mol of a pyridine catalyst. The resulting mixture is heated to 80° C. and reacted for 6 hours. The reaction product is vacuum-distilled to remove the acetic acid anhydride catalyst, the pyridine catalyst, and the NMP solvent, preparing a soluble polyimide (PI-6C) solution including a solid content of 20 wt %.

The soluble polyimide (PI-6C) solution is distilled to prepare pure soluble polyimide (PI-6C) having a weight average molecular weight of 200,000. The soluble polyimide (PI-6C) is added to an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including soluble polyimide (PI-6C). The liquid crystal photo-alignment agent includes a solid content of 6.5 wt %.

Example 51

Preparation of a Liquid Crystal Photo-Alignment Agent Including Polyimide (PI-51)

0.5 mol (primary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room, while nitrogen is passed therethrough, and N-methyl-2-pyrrolidone (NMP) is added thereto to dissolve the compound of the above Chemical Formula 26 therein.

The solution is mixed with 1.0 mol of 4,10-dioxa-tricyclo [$6.3.1.0^{2,7}$]dodecane-3,5,9,11-tetraone (referred to as "2,3,5-tricarboxylcyclopentyl acetic acid anhydride") in a solid state. The mixture is intensely agitated.

After one hour of agitation, the agitated product is mixed with 0.4 mol (secondary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 0.05 mol of 4-(4,4,4-trifluoro butoxy)-benzoic acid 1,1'-[[2,2-bis[(4-aminophenyl)methyl]-1,4-propanedyl]bis[oxy[1E-3-oxo-1-propene-1-yl]-4,1-phenylene]] ester represented by the above Chemical Formula 30, and 0.05 mol of 4-octadecyl oxy benzene-1,3-diamine represented by Chemical Formula 27. The mixture is reacted up to an appropriate viscosity of about 150 cps.

The prepared solution includes a solid content of 30 wt % and is reacted for 24 hours at room temperature, preparing a polyamic acid solution.

The polyamic acid solution is mixed with 3.0 mol of an acetic acid anhydride catalyst and 5.0 mol of a pyridine catalyst. The mixture is heated to 80° C. and reacted for 6 hours. The reaction product is vacuum-distilled to remove the acetic acid anhydride and pyridine catalysts and the NMP solvent, preparing a soluble polyimide (PI-51) solution having a solid content of 20 wt %.

The soluble polyimide (PI-51) solution is distilled to prepare pure soluble polyimide (PI-51) having a weight average molecular weight of 200,000. The soluble polyimide (PI-51) is added to an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including soluble polyimide (PI-51). The liquid crystal photo-alignment agent has a solid content of 6.5 wt %.

Examples 52 to 60

Preparation of a Liquid Crystal Photo-Alignment Agent Including Polyimide (PI-52 to PI-60)

Polyamic acid is prepared according to the same method as Example 51, except for using 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 4-(4,4,4-trifluoro butoxy)-benzoic acid 1,1'-[[2,2-bis[(4-aminophenyl)methyl]-1,4-propandyl]bis[oxy[1E-3-oxo-1-propene-1-yl]-4,1-phenylene]]ester represented by the above Chemical Formula 30, and 4-octadecyl oxy benzene-1,3-diamine represented by the above Chemical Formula 27 as shown in the following Table 5. Then, the polyamic acid is used according to the same method as Example 51 to prepare a liquid crystal photo-alignment agent respectively including soluble polyimide (PI-52 to PI-60). All of the liquid crystal photo-alignment agents include a solid content of 6.5 wt %.

In the following Table 5, the amount of 4-(4,4,4-trifluoro butoxy)-benzoic acid 4-{2-[2-(2,4-diamino-phenyl)ethoxycarbonyl]-vinyl}-phenyl ester represented by Chemical Formula 26 is the sum of primary and secondary addition amounts. The primary amount is 0.5 mol in all examples.

TABLE 5

| | Preparation Example | Chemical Formula 26 | Chemical Formula 30 | Chemical Formula 27 | Type |
|---|---|---|---|---|---|
| Comparative Example 5 | PAA-5C | 100 | — | — | polyamic acid |
| Example 41 | PAA-41 | 90 | 5 | 5 | polyamic acid |
| Example 42 | PAA-42 | 80 | 5 | 15 | polyamic acid |
| Example 43 | PAA-43 | 70 | 5 | 25 | polyamic acid |
| Example 44 | PAA-44 | 60 | 5 | 35 | polyamic acid |
| Example 45 | PAA-45 | 80 | 10 | 10 | polyamic acid |
| Example 46 | PAA-46 | 70 | 10 | 20 | polyamic acid |
| Example 47 | PAA-47 | 60 | 10 | 30 | polyamic acid |
| Example 48 | PAA-48 | 80 | 15 | 5 | polyamic acid |
| Example 49 | PAA-49 | 70 | 15 | 15 | polyamic acid |
| Example 50 | PAA-50 | 60 | 15 | 25 | polyamic acid |
| Comparative Example 6 | PI-6C | 100 | — | — | polyimide |
| Example 51 | PI-51 | 90 | 5 | 5 | polyimide |
| Example 52 | PI-52 | 80 | 5 | 15 | polyimide |
| Example 53 | PI-53 | 70 | 5 | 25 | polyimide |
| Example 54 | PI-54 | 60 | 5 | 35 | polyimide |
| Example 55 | PI-55 | 80 | 10 | 10 | polyimide |
| Example 56 | PI-56 | 70 | 10 | 20 | polyimide |
| Example 57 | PI-57 | 60 | 10 | 30 | polyimide |
| Example 58 | PI-58 | 80 | 15 | 5 | polyimide |

TABLE 5-continued

| | Preparation Example | Chemical Formula 26 | Chemical Formula 30 | Chemical Formula 27 | Type |
|---|---|---|---|---|---|
| Example 59 | PI-59 | 70 | 15 | 15 | polyimide |
| Example 60 | PI-60 | 60 | 15 | 25 | polyimide |

In Table 5, the unit of the amounts of Chemical Formulas 26, 30, and 27 is mol %, which indicates the amount of each used to prepare the polyamic acids, based on the entire number of moles of diamine used to prepare the polyamic acids. In addition, the amounts in mol % of the first, second, and third structural units of polyimide or polyamic acid are the same as the mol % of a compound represented by the chemical formula.

Property Evaluation

The liquid crystal photo-alignment agents according to Examples 41 to 60 and Comparative Examples 5 and 6 are used according to the same method as Example 1 to fabricate liquid crystal cells. The liquid crystal photo-alignment properties, voltage-transmission, voltage holding ratio, and residual DC of the liquid crystal cells are evaluated using the same methods as Example 1. The results are provided in the following Table 6.

TABLE 6

| Synthesis Example | Photo-alignment property | Voltage-transmission | Voltage holding ratio Room temperature 25° C. | Voltage holding ratio High temperature 60° C. | RDC |
|---|---|---|---|---|---|
| Comparative Example 5 | Good | Good | 98.60 | 97.23 | 200 |
| Example 41 | Good | Good | 99.46 | 99.27 | 50 |
| Example 4 | Good | Good | 99.45 | 99.18 | 50 |
| Example 43 | Good | Good | 99.50 | 99.26 | 53 |
| Example 44 | Good | Good | 99.50 | 99.22 | 62 |
| Example 45 | Good | Good | 99.55 | 99.17 | 55 |
| Example 46 | Good | Good | 99.53 | 99.26 | 55 |
| Example 47 | Good | Good | 99.44 | 99.25 | 44 |
| Example 48 | Good | Good | 99.48 | 99.20 | 50 |
| Example 49 | Good | Good | 99.45 | 99.19 | 60 |
| Example 50 | Good | Good | 99.41 | 99.23 | 49 |
| Comparative Example 6 | Good | Good | 98.41 | 96.98 | 112 |
| Example 51 | Good | Good | 99.51 | 99.20 | 61 |
| Example 52 | Good | Good | 99.57 | 99.31 | 50 |
| Example 53 | Good | Good | 99.53 | 99.20 | 42 |
| Example 54 | Good | Good | 99.56 | 99.29 | 51 |
| Example 55 | Good | Good | 99.51 | 99.22 | 47 |
| Example 56 | Good | Good | 99.51 | 99.25 | 61 |
| Example 57 | Good | Good | 99.55 | 99.25 | 55 |
| Example 58 | Good | Good | 99.46 | 99.17 | 50 |
| Example 59 | Good | Good | 99.46 | 99.19 | 48 |
| Example 60 | Good | Good | 99.46 | 99.26 | 55 |

Referring to Table 6, the liquid crystal alignment agents according to Examples 41 to 60 have improved voltage holding ratios (VHR) and RDC characteristics as compared to the ones of Comparative Examples 5 and 6.

The voltage holding ratio and residual DC are references for evaluating the after-image characteristic of a liquid crystal alignment layer. The higher voltage holding ratio and lower residual DC indicates an excellent after-image characteristic. Accordingly, the liquid crystal photo-alignment agents according to Examples 41 to 60 have a better after-image characteristic than the ones of Comparative Examples 5 and 6.

Comparative Example 7

Preparation of a Liquid Crystal Photo-Alignment Agent Including Polyimide (PI-7C)

0.5 mol of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room, while nitrogen is passed therethrough, and N-methyl-2-pyrrolidone (NMP) is added thereto to dissolve the compound represented by the above Chemical Formula 26 therein.

The solution is mixed with 1.0 mol of 4,10-dioxa-tricyclo[6.3.1.0$^{2,7}$]dodecane-3,5,9,11-tetraone (referred to as "2,3,5-tricarboxylcyclopentyl acetic acid anhydride") in a solid state. The mixture is intensely agitated.

After one hour of agitation, this agitated product is mixed with 0.5 mol of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26. The mixture is reacted up to an appropriate viscosity of about 150 cps. The prepared solution includes a solid content of 30 wt % and is copolymerized for 24 hours while the temperature is maintained at 45° C., preparing a polyamic acid solution.

The polyamic acid solution is mixed with 3.0 mol of an acetic acid anhydride catalyst and 5.0 mol of a pyridine catalyst. The mixture is heated to 80° C. and reacted for 6 hours.

The reaction product is vacuum-distilled to remove the acetic acid anhydride and pyridine catalysts and the NMP solvent, preparing a soluble polyimide (PI-70) solution including a solid content of 20 wt %.

The soluble polyimide (PI-70) solution is distilled, preparing pure soluble polyimide (PI-70) having a weight average molecular weight of 200,000. The soluble polyimide (PI-70) is added to an organic solvent prepared by mixing N-methyl-2-pyrrolidone (NMP), γ-butyrolactone, and 2-butyl celusolve in a volume ratio of 3:4:3. The resulting mixture is agitated at room temperature for 24 hours, preparing a liquid crystal photo-alignment agent including soluble polyimide (PI-70). The liquid crystal photo-alignment agent includes a solid content of 6.5 wt %.

Example 61

Preparation of a Liquid Crystal Photo-Alignment Agent Including Polyimide (PI-61)

0.5 mol (primary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room while nitrogen is passed therethrough, and N-methyl-2-pyrrolidone (NMP) is added thereto to dissolve the compound represented by the above Chemical Formula 26 therein.

The solution is mixed with 1.0 mol of 4,10-dioxa-tricyclo [6.3.1.0$^{2,7}$]dodecane-3,5,9,11-tetraone (referred to as "2,3,5-tricarboxylcyclopentyl acetic acid anhydride") in a solid state. The mixture is agitated.

After one hour of agitation, the agitated product is mixed with 0.3 mol (secondary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 0.05 mol of 3,5-diaminobenzoate-3-cholestanol represented by the above Chemical Formula 8, and 0.15 mol of 4-octadecyl oxybenzene-1,3-diamine represented by the above Chemical Formula 27. The mixture is reacted up to an appropriate viscosity of about 150 cps.

The prepared solution includes a solid content of 30 wt % and is copolymerized for 24 hours while the temperature is maintained at 45° C., preparing a polyamic acid solution.

The polyamic acid solution is mixed with 3.0 mol of an acetic acid anhydride catalyst and 5.0 mol of a pyridine catalyst. The mixture is heated to 80° C. and reacted for 6 hours. The reaction product is vacuum-distilled to remove the acetic acid anhydride and pyridine catalysts and the NMP solvent, preparing a soluble polyimide PI-61 solution having a solid content of 20 wt %.

The soluble polyimide PI-61 solution is distilled, acquiring pure soluble polyimide (PI-61) having a weight average molecular weight of 200,000. The soluble polyimide PI-61 is added to an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including soluble polyimide (PI-61). The liquid crystal photo-alignment agent includes a solid content of 6.5 wt %.

Examples 62 to 70

Preparation of a Liquid Crystal Photo-Alignment Agent Including Polyimide (PI-62 to PI-70)

Polyamic acid is prepared according to the same method as Example 61 except for using 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 3,5-diaminobenzoate-3-cholestanol represented by the above Chemical Formula 8, and 4-octadecyl oxybenzene-1,3-diamine represented by the above Chemical Formula 27 in an amount provided in the following Table 7. This polyamic acid is used according to the same method as Example 61 to prepare a liquid crystal photo-alignment agent respectively including polyimides (PI-62 to PI-70) having a weight average molecular weight of 200,000. All of the liquid crystal photo-alignment agents include a solid content of 6.5 wt %.

In Table 7, the amount of 4-(4,4,4-trifluoro butoxy)-benzoic acid 4-{2-[2-(2,4-diamino-phenyl)-ethoxycarbonyl]-vinyl}-phenyl ester represented by Chemical Formula 26 is the sum of primary and secondary addition amounts. The primary addition is 0.5 mol in all examples.

Example 71

Preparation of a Liquid Crystal Photo-Alignment Agent Including Polyimide (PI-71)

0.5 mol of (primary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26 is put in a four-neck flask mounted with an agitator, a temperature controller, a nitrogen gas injector, and a condenser in a dark room while nitrogen is passed therethrough, and N-methyl-2-pyrrolidone (NMP) is added thereto to dissolve the compound represented by the above Chemical Formula 26 therein.

The solution is mixed with 1.0 mol of 4,10-dioxa-tricyclo [6.3.1.0$^{2,7}$]dodecane-3,5,9,11-tetraone (referred to as "2,3,5-tricarboxylcyclopentyl acetic acid anhydride") in a solid state. The mixture is intensely agitated.

After one hour of agitation, the agitated product is mixed with 0.3 mol (secondary addition) of 4-(4,4,4-trifluoro butoxy)-benzoic acid 4-{2-[2-(2,4-diamino-phenyl)-ethoxycarbonyl]-vinyl}-phenyl ester represented by the above Chemical Formula 26, 0.05 mol of 1-(3,5-diaminophenyl)-3-octadecyl succinimide represented by the above Chemical Formula 29, and 0.15 mol of 4-octadecyl oxybenzene-1,3-diamine represented by the above Chemical Formula 27. The mixture is reacted up to an appropriate viscosity of about 150 cps.

The solution includes a solid content of 30 wt % and is reacted for 24 hours at 50° C., preparing a polyamic acid solution.

The polyamic acid solution is mixed with 3.0 mol of an acetic acid anhydride catalyst and 5.0 mol of a pyridine catalyst. The mixture is heated to 80° C. and reacted for 6 hours. The reaction product is vacuum-distilled to remove the acetic acid anhydride and pyridine catalysts and the NMP solvent, preparing a soluble polyimide PI-71 solution including a solid content of 20 wt %.

The soluble polyimide (PI-71) solution is distilled, acquiring pure soluble polyimide (PI-71) having a weight average molecular weight of 200,000. The soluble polyimide (PI-71) is added to an organic solvent prepared by mixing N-methyl-2-pyrrolidone (NMP), γ-butyrolactone, and 2-butyl celusolve in a volume ratio of 3:4:3. The mixture is agitated at room temperature for 24 hours, preparing a liquid crystal photo-alignment agent including a soluble polyimide (PI-71). The liquid crystal photo-alignment agent includes a solid content of 6.5 wt %.

Examples 72 to 80

Preparation of a Liquid Crystal Photo-Alignment Agent Including Polyimide (PI-72 to PI-80)

Polyamic acid is prepared according to Example 71 except for using 4-(4,4,4-trifluoro butoxy)-benzoic acid 4-{2-[2-(2, 4-diamino-phenyl)-ethoxycarbonyl]-vinyl}-phenyl ester represented by the above Chemical Formula 26, 1-(3,5-diaminophenyl)-3-octadecylsuccinimide represented by the above Chemical Formula 29, and 4-octadecyl oxybenzene-1,3-diamine represented by the above Chemical Formula 27 in an amount provided in the following Table 7. The polyamic acid is used to prepare a liquid crystal photo-alignment agent respectively including polyimides (PI-72 to PI-80) according to the same method as Example 71. The polyimides have a weight average molecular weight of 200,000.

In Table 7, the amount of 4-(4,4,4-trifluoro butoxy)-benzoic acid 4-{2-[2-(2,4-diamino-phenyl)-ethoxycarbonyl]-vinyl}-phenyl ester represented by Chemical Formula 26 is the sum of primary and secondary addition amounts. The primary addition was 0.5 mol in all examples.

TABLE 7

| | Preparation Example | Chemical Formula 26 | Chemical Formula 8 | Chemical Formula 29 | Chemical Formula 27 |
|---|---|---|---|---|---|
| Comparative Example 7 | PI-7C | 100 | — | — | — |
| Example 61 | PI-61 | 80 | 5 | — | 15 |
| Example 62 | PI-62 | 70 | 5 | — | 25 |
| Example 63 | PI-63 | 70 | 8 | — | 22 |
| Example 64 | PI-64 | 70 | 10 | — | 20 |
| Example 65 | PI-65 | 60 | 5 | — | 35 |
| Example 66 | PI-66 | 60 | 8 | — | 32 |
| Example 67 | PI-67 | 60 | 10 | — | 30 |
| Example 68 | PI-68 | 50 | 5 | — | 45 |
| Example 69 | PI-69 | 50 | 8 | — | 42 |
| Example 70 | PI-70 | 50 | 10 | — | 40 |
| Example 71 | PI-71 | 80 | — | 5 | 15 |
| Example 72 | PI-72 | 70 | — | 5 | 25 |
| Example 73 | PI-73 | 70 | — | 8 | 22 |
| Example 74 | PI-74 | 70 | — | 10 | 20 |
| Example 75 | PI-75 | 60 | — | 5 | 35 |
| Example 76 | PI-76 | 60 | — | 8 | 32 |
| Example 77 | PI-77 | 60 | — | 10 | 30 |
| Example 78 | PI-78 | 50 | — | 5 | 45 |
| Example 79 | PI-79 | 50 | — | 8 | 42 |
| Example 80 | PI-80 | 50 | — | 10 | 40 |

In Table 7, the unit of the amounts of Chemical Formulas 26, 8, 29, and 27 is mol %, which indicates the amount of each used to prepare the polyamic acids, based on the entire number of moles of diamine used to prepare the polyamic acids. In addition, the mol % of the first, second, and third structural units of the polyamic acids or polyimides are the same as the mol % of a compound represented by the chemical formulas.

Property Evaluation

The liquid crystal photo-alignment agents according to Examples 61 to 80 and Comparative Example 7 are used to fabricate liquid crystal cells according to the same method as Example 1. The liquid crystal photo-alignment properties, voltage-transmission, voltage holding ratio, and residual DC of the liquid crystal cells are evaluated using the same methods as in Example 1. The results are provided in the following Table 8.

TABLE 8

| Synthesis Example | Photo-alignment property | Voltage-transmission | Voltage holding ratio | | RDC |
|---|---|---|---|---|---|
| | | | Room temperature 25° C. | High temperature 60° C. | |
| Comparative Example 7 | Good | Good | 98.38 | 97.08 | 401 |
| Example 61 | Good | Good | 99.43 | 99.21 | 65 |
| Example 62 | Good | Good | 99.51 | 99.19 | 51 |
| Example 63 | Good | Good | 99.49 | 99.23 | 53 |
| Example 64 | Good | Good | 99.42 | 99.25 | 48 |
| Example 65 | Good | Good | 99.54 | 99.18 | 60 |
| Example 66 | Good | Good | 99.46 | 99.16 | 55 |
| Example 67 | Good | Good | 99.48 | 99.13 | 62 |
| Example 68 | Good | Good | 99.52 | 99.17 | 49 |
| Example 69 | Good | Good | 99.43 | 99.22 | 57 |
| Example 70 | Good | Good | 99.45 | 99.26 | 53 |
| Example 71 | Good | Good | 99.55 | 99.20 | 51 |
| Example 72 | Good | Good | 99.48 | 99.16 | 61 |

TABLE 8-continued

| Synthesis Example | Photo-alignment property | Voltage-transmission | Voltage holding ratio | | RDC |
|---|---|---|---|---|---|
| | | | Room temperature 25° C. | High temperature 60° C. | |
| Example 73 | Good | Good | 99.45 | 99.21 | 53 |
| Example 74 | Good | Good | 99.50 | 99.18 | 43 |
| Example 75 | Good | Good | 99.53 | 99.20 | 51 |
| Example 76 | Good | Good | 99.51 | 99.22 | 47 |
| Example 77 | Good | Good | 99.47 | 99.17 | 49 |
| Example 78 | Good | Good | 99.49 | 99.23 | 56 |
| Example 79 | Good | Good | 99.48 | 99.26 | 51 |
| Example 80 | Good | Good | 99.53 | 99.29 | 60 |

Referring to Table 8, the liquid crystal photo-alignment agents according to Examples 61 to 80 have improved voltage holding ratios (VHR) and RDC characteristics as compared to the one of Comparative Example 7.

The voltage holding ratio and residual DC are a reference for evaluating the after-image characteristic of a liquid crystal alignment layer. The higher voltage holding ratio and the lower residual DC indicates a better after-image characteristic. Accordingly, the liquid crystal photo-alignment agents according to Examples 61 to 80 have better after-image characteristics than the one of Comparative Example 7.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal photo-alignment agent comprising:
a polymer compound comprising polyamic acid comprising a first structural unit derived from a photo-diamine represented by the following Chemical Formula 1, a second structural unit derived from a diamine represented by the following Chemical Formula 2, and a third structural unit derived from a second photo-diamine represented by the following Chemical Formula 2-2, a polyimide prepared by imidizing said polyamic acid, or a combination thereof; and
optionally a solvent:

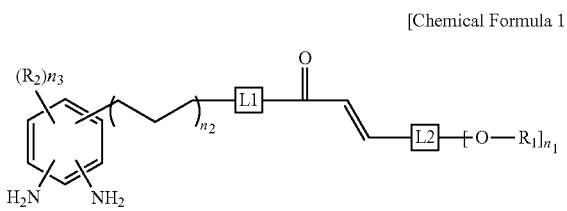

[Chemical Formula 1]

wherein,
each $R_1$ independently comprises a substituted or unsubstituted aliphatic organic group, a substituted or unsubstituted alicyclic organic group, or a substituted or unsubstituted aromatic organic group, each $R_2$ independently comprises a substituted or unsubstituted aliphatic organic group, a substituted or unsubstituted alicyclic organic group, or a substituted or unsubstituted aromatic organic group, L1 comprises —O— or —NH—, L2 comprises a functional group comprising unsubstituted alkylene, alkylene substituted with at least one halogen or cyano, alkylene comprising at least one substituent comprising —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —NR'—, —CO—NR'—, —CH=CH—, —C≡C—, —O—CO—O—, —O—R"—, —CO—R"—, —CO—O—R"—, —O—CO—R"—, —Si(CH$_3$)$_2$—O—Si(CH$_3$)$_2$—, —NR'—R"—, —NR'—CO—R"—, —CO—NR'—R"—, —NR'—CO—O—R"—, —O—CO—NR'—R"—, —NR'—R"—, —CO—NR'—R"—, —CH=CH—R"—, —C≡C—R"—, -or —O—CO—O—R'— (wherein R' is hydrogen or substituted or unsubstituted C1 to C6 alkyl and R" is arylene), —R"—O—CO—R"— (wherein R" is arylene), or a combination thereof, n1 is an integer ranging from 1 to 5, n2 is an integer ranging from 0 to 3, and n3 is an integer ranging from 0 to 3,

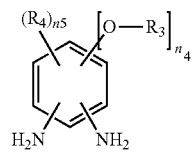

[Chemical Formula 2]

wherein, in Chemical Formula 2, n4 is an integer ranging from 1 to 4, n5 is an integer ranging from 0 to 3, n4+n5 is an integer ranging from 1 to 4, each $R_3$ independently comprises a substituted or unsubstituted aliphatic organic group, a substituted or unsubstituted alicyclic organic group, or a substituted or unsubstituted aromatic organic group, and each $R_4$ independently comprises a substituted or unsubstituted aliphatic organic group, a substituted or unsubstituted alicyclic organic group, or a substituted or unsubstituted aromatic organic group,

[Chemical Formula 2-2]

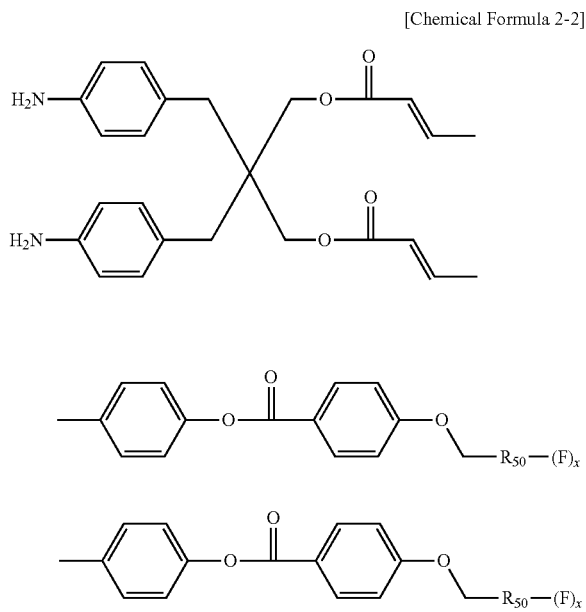

[Chemical Formula 1-1]

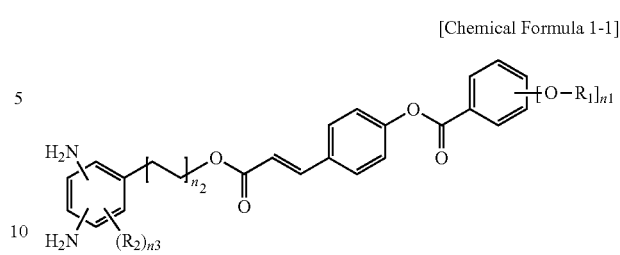

wherein, in Chemical Formula 1-1, each $R_1$ independently comprises a substituted or unsubstituted aliphatic organic group, a substituted or unsubstituted alicyclic organic group, or a substituted or unsubstituted aromatic organic group, each $R_2$ independently comprises a substituted or unsubstituted aliphatic organic group, a substituted or unsubstituted alicyclic organic group, or a substituted or unsubstituted aromatic organic group, n1 is an integer ranging from 1 to 5, n2 is an integer ranging from 0 to 3, and n3 is an integer ranging from 0 to 3,

[Chemical Formula 1-2]

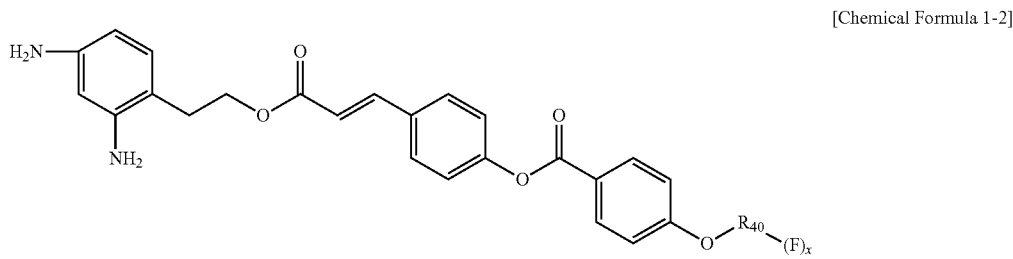

wherein, x is an integer ranging from 0 to 9, and each $R_{50}$ independently comprises substituted or unsubstituted alkylene, wherein at least one of the —CH$_2$— groups of the alkylene is independently substituted with —CO—, —CO—O—, —NR$_{51}$—, —NR$_{51}$CO—, —CO—NR$_{51}$— or —CH=CH—, wherein $R_{51}$ comprises hydrogen or alkyl, provided that oxygen atoms are not directly linked to each other, with the proviso that when x is 0, each $R_{50}$ independently comprises substituted or unsubstituted alkyl, wherein at least one of the —CH$_2$— groups of the alkyl is independently substituted with —CO—, —CO—O—, —NR$_{51}$—, —NR$_{51}$CO—, —CO—NR$_{51}$— or —CH=CH—, wherein $R_{51}$ comprises hydrogen or alkyl, provided that oxygen atoms are not directly linked to each other.

2. The liquid crystal photo-alignment agent of claim 1, comprising the first, second, and third structural units in a mole ratio ranging from 40 to 90 mol %:5 to 45 mol %:5 to 15 mol %.

3. The liquid crystal photo-alignment agent of claim 1, wherein the first structural unit is derived from at least one photo-diamine represented by the following Chemical Formulas 1-1 and 1-2:

wherein, in Chemical Formula 1-2, $R_{40}$ comprises linear or branched substituted or substituted alkylene, wherein at least one of the —CH2-groups of the alkylene is independently substituted with —CO—, —CO—O—, —NR$_{41}$—, —NR$_{41}$CO—, —CO—NR$_{41}$—, or —CH=CH—, wherein $R_{41}$ is hydrogen or alkyl, provided that oxygen atoms are not directly linked to each other, and x is 0 to 9, with the proviso that when x is 0, $R_{40}$ comprises linear or branched substituted or unsubstituted alkyl, wherein at least one of the —CH$_2$— groups of the alkyl is independently substituted with —CO—, —CO—O—, —NR$_{41}$—, —NR$_{41}$CO—, —CO—NR$_{41}$—, or —CH=CH—, wherein $R_{41}$ is hydrogen or alkyl, provided that oxygen atoms are not directly linked to each other.

4. The liquid crystal photo-alignment agent of claim 1, wherein the polymer compound has a weight average molecular weight ranging from 50,000 to 500,000.

5. The liquid crystal photo-alignment agent of claim 1, wherein the liquid crystal photo-alignment agent comprises a solid content ranging from 1 to 30 wt %.

6. The liquid crystal photo-alignment agent of claim 1, wherein the liquid crystal photo-alignment agent has viscosity ranging from 3 to 35 cps.

7. A liquid crystal photo-alignment layer fabricated by coating the liquid crystal photo-alignment agent of claim 1 on a substrate.

8. A liquid crystal display (LCD) comprising the liquid crystal photo-alignment layer of claim 7.

* * * * *